US008300650B2

(12) United States Patent
Rojas-Cessa et al.

(10) Patent No.: US 8,300,650 B2
(45) Date of Patent: Oct. 30, 2012

(54) CONFIGURING A THREE-STAGE CLOS-NETWORK PACKET SWITCH

(75) Inventors: Roberto Rojas-Cessa, Brooklyn, NY (US); Chuan-Bi Lin, Kearny, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 605 days.

(21) Appl. No.: 12/485,828

(22) Filed: Jun. 16, 2009

(65) Prior Publication Data

US 2010/0316061 A1    Dec. 16, 2010

(51) Int. Cl.
*H04L 12/56* (2006.01)
(52) U.S. Cl. ........ 370/417; 370/412; 370/416; 370/388; 340/2.21; 340/2.22
(58) Field of Classification Search .......... None
See application file for complete search history.

(56) References Cited

U.S. PATENT DOCUMENTS

| | | | |
|---|---|---|---|
| 6,940,851 B2 | 9/2005 | Oki | |
| 7,046,661 B2 | 5/2006 | Oki et al. | |
| 7,342,887 B1 | 3/2008 | Sindhu et al. | |
| 2003/0021266 A1* | 1/2003 | Oki et al. | 370/388 |

FOREIGN PATENT DOCUMENTS

WO    2007078824 A2    7/2007

OTHER PUBLICATIONS

Eiji Oki, Zhigang Jing, Roberto Rojas-Cessa, H. Jonathan Chao, Concurrent Round-Robin-Based Dispatching Schemes for Clos-Network Switches, IEEE/ACM Trans. Networking, May 2001, pp. 830-840, vol. 10 No. 6, USA.

Chuan-Bi Lin, Roberto Rojas-Cessa, Module Matching Schemes for Input-Queued Clos-Network Switches, IEEE 2006 Communication Letters, Feb. 1992, pp. 194-196, vol. 11 No. 2, USA.

Roberto Rojas-Cessa, Eiji Oki, H. Jonathan Chao, CIXB-1: Combined Input-One-cell-crosspoint Buffered Switch, Proceedings of IEEE Workshop on High Performance Switching and Routing, May 29-31, 2001, pp. 324-329, Dallas, TX, USA.

Mark J. Karol, Michael G. Hluchyj, Queuing in High-performance Packet-switching, IEEE Journal on Selected Areas of Communications, Dec. 1988, vol. 6, pp. 1587-1597.

Nick McKeown, Adisak Mekkittikul, Venkat Anantharam, Jean Walrand, Achieving 100% Throughput in an Input-queued Switch, IEEE Transactions on Communications., Aug. 1999, vol. 47 No. 8, pp. 1260-1267.

Chao, H.J. et al., Matching Algorithms for Three-Stage Bufferless Clos Network Switches, IEEE Communications Magazine, Oct. 2003, pp. 46-54.

Rojas-Cessa, R. et al., Scalable Two-Stage Clos Network Switch and Module-First Matching, Workshop on High Performance Switching and Routing, 2006, IEEE.

Lin et al., Module Matching Schemes for Input-Queued Clos-Network Packet Switches, IEEE Communications Letters, pp. 194-196, vol. 11, issue 2, Feb. 2007.

Wang et al., Analysis on the Central-Stage Buffered Clos-Network for Packet Switching, ICC 2005, 2005 IEEE International Conference on Communications, (2005), pp. 1053-1057.

(Continued)

*Primary Examiner* — Ayaz Sheikh
*Assistant Examiner* — Nicholas Sloms

(57) ABSTRACT

Examples of are disclosed for configuring one or more routes through a three-stage Clos-network packet switch.

31 Claims, 16 Drawing Sheets

OTHER PUBLICATIONS

Roberto Rojas-Cessa., "NeTS-NR: Networks with Extended Quality of Service Using Service Vectors," National Science Foundation, 2009, accessed online on Mar. 23, 2012 via http://hw2.your-researchportal.com/kmp/?q=eng/node/2666.

International Search Report and Written Opinion for International Application No. PCT/US2010/038361 mailed on Jul. 30, 2010.
International Preliminary Report on Patentability for International Application No. PCT/US2010/038361 mailed on Dec. 29, 2011.

* cited by examiner

1700 A computer program product.

1702 A signal bearing medium.

1704 Instructions for configuring one or more routes through a three-stage Clos-network packet switch including input modules, central modules and output modules, which, when executed by logic associated with an input port for the three-stage Clos-network packet switch causes the logic to:

obtain a cell count associated with data partitioned into one or more cells and stored at one or more virtual output queues maintained at an input port coupled to an input module for the three-stage Clos-network packet switch, the one or more virtual output queues associated with one or more output modules for the three-stage Clos-network packet switch, the one or more cells destined for an output port coupled to an output module from among the one or more output modules;

determine which of the one or more virtual output queues associated with a given output module from among the one or more output modules has the largest total cell count;

place a request to match a first link between the input module and a given central module, the request to indicate the total cell count for the one or more virtual output queues associated with the given output module that were determined to have the largest total cell count;

receive a grant for the request based on the indicated total cell count being greater than a total cell count indicated in one or more other requests;

accept the grant to match the first link;

receive an indication that a separate request to match a second link between the given central module and the given output module has been granted and the grant accepted to match the second link;

configure a route from a virtual output queue, the configured route to include the first matched link and the second matched link, the virtual output queue selected from among the one or more virtual output queues associated with the given output module, selection based on the virtual output queue having the largest cell count, wherein in response to a cell transfer interval, a cell stored at the virtual output queue is forwarded via the configured route to a queue maintained at the given output module, the queue associated with the destination output port for the cell.

| 1706 a computer-readable medium. | 1708 a recordable medium. | 1710 a communications medium. |

FIG. 17

CONFIGURING A THREE-STAGE CLOS-NETWORK PACKET SWITCH

BACKGROUND

A typical three-stage Clos-network packet switch includes three stages of switch modules assembled to create a packet switch capable of having a large number of ports. These three stages typically include input modules, central modules and output modules. Generally, the more input, central and output modules included in a three-stage Clos-network packet switch, the more ports the switch may support. As a result of an ability to support a variable amount of ports, a three-stage Clos-network packet switch architecture may be considered a scalable switch architecture. Companies that manage communication networks such as Internet service providers or telecommunication service providers may find the scalability of three-stage Clos-network packet switch architectures as an attractive attribute. However, configuring routes to forward data through a three-stage Clos-network packet switch that has been scaled to include a large number of ports may be a complex and slow process.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 17 illustrates a block diagram of an example computer program product; and

DETAILED DESCRIPTION

Figure 1:
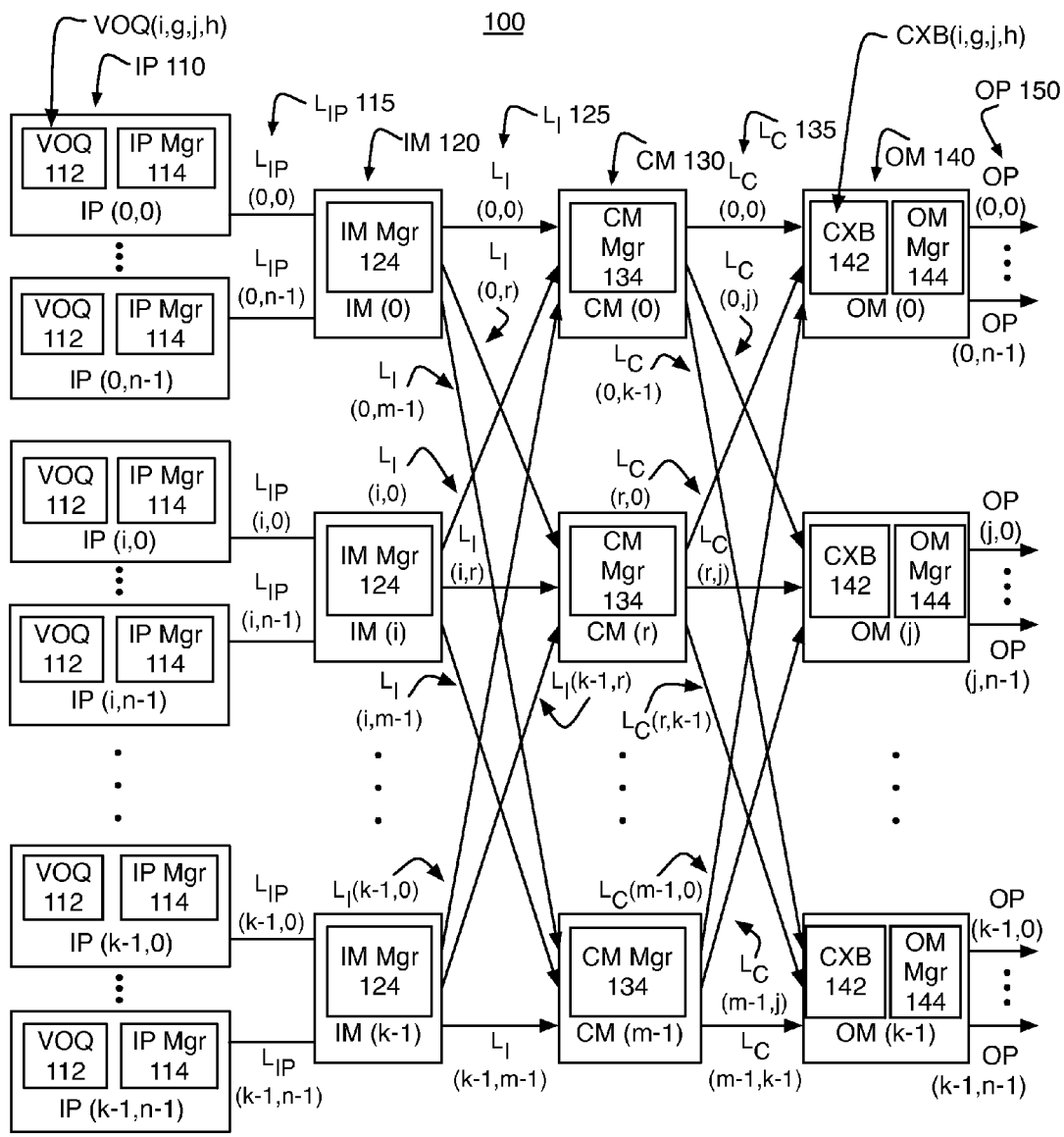
FIG. 1 illustrates an example three-stage Clos-network packet switch with a variable number of ports and modules.

In the following detailed description, reference is made to the accompanying drawings, which form a part hereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from the spirit or scope of the subject matter presented here. It will be readily understood that aspects of this disclosure, as generally described herein, and illustrated in the Figures, may be arranged, substituted, combined, and designed in a wide variety of different configurations, all of which are explicitly contemplated and make part of this disclosure.

This disclosure is drawn, inter alia, to methods, apparatus, systems and computer program products related to configuring one or more routes through a three-stage Clos-network packet switch.

As contemplated in the present disclosure, configuration of routes to forward data through a three-stage Clos-network packet switch that has been scaled to include a large number of ports may be a complex and slow process. Certain aspects of the design of a three-stage Clos-network packet switch may impact the complexity and speed of configuration. For example, a type of three-stage Clos-network packet switch design may be an input-queued Clos-network packet switch ("IQC switch"). An IQC switch may include queues or buffers that are maintained at the input ports, hereinafter referred to as "virtual output queues" (VOQs). These VOQs may at least temporarily store data that has been partitioned into fixed-length packets ("cells") to facilitate internal switching or routing of data through an IQC switch. However, an IQC switch design may require a complex and possibly time consuming link matching process to configure a route through the IQC switch. For example, output port contention and path routing through the three-stages of an IQC switch may need to be resolved before a cell may be forwarded through links of the IQC switch. Because of this increased complexity and time consumption, as an IQC switch scales to a larger size (e.g., more modules and ports), maintaining a high level of throughput and an acceptable quality of service for data routed through the IQC switch may be problematic.

In some examples, methods for configuring one or more routes through a three-stage Clos-network packet switch (e.g., an IQC switch) are implemented. According to the example methods, a cell count is obtained for data partitioned into one or more cells and stored at one or more VOQs maintained at an input port coupled to an input module for the three-stage Clos-network packet switch. The VOQs, for example, may be associated with one or more output modules for the three-stage Clos-network packet switch. The cells stored at the VOQs may be destined for an output port coupled to an output module from among the output models. A determination is made as to which of the VOQs associated with a given output port module from among the output modules has the largest total cell count. Further, a request is placed to match a first link between the input module and a given central module, the request to indicate the total cell count for the one or more VOQs associated with the given output port module that were determined to have the largest total cell count.

Also, according to the example methods, a grant may be received for the request based on the indicated total cell count being greater than total cell counts indicated in one or more other requests. The grant may be accepted to match the first link. Also, an indication that a separate request has been received to match a second link between the given central module and the given output module has been granted and the grant accepted to match the second link. A route may then be configured from a VOQ. The configured route may include the first matched link and the second matched link. The VOQ selected from among the VOQs associated with the given output module. Selection of the VOQ, for example, based on the VOQ having the largest cell count. Further, in response to a cell transfer interval, a cell stored at the VOQ may be forwarded via the configured route to a queue maintained at the given output module. The queue, for example, is associated with the destination output port for the cell.

FIG. 1 illustrates an example three-stage Clos-network packet switch 100 with a variable number of ports and switch modules that are arranged in accordance with the present disclosure. As illustrated in FIG. 1, switch 100 includes input modules ("IMs") 120 at a first stage, central modules ("CMs") 130 at a second stage, and output modules ("OMs") 140 at a third stage.

In some examples, as depicted in FIG. 1, each IM 120 may be coupled to a number (n) of input ports ("IPs") 110 via input port links ("$L_{IP}$") 115. For example, if there are a number (k) of IM 120s, there may be a total of n*k IP 110s. Similarly, each OM 140 may include a number (n) of output ports ("OPs") 145. For example, if there are a number (k) of OM 140's there may be a total of n*k OP 150s.

In some examples, as illustrated in FIG. 1, switch 100 may include a number of (m) CM 130s that may be arranged between a number (k) of IM 120s and a number (k) of OM 140s. Also, a given IM 120 is shown as including a number (m) of outgoing links $L_I$ 125. Links $L_I$ 125, for example, which may be configured to couple IM 120 to a different one of the m CM 130s. Similarly, a given CM 130 may include a number (k) of outgoing links $L_C$ 135. Links $L_C$ 135, for example, may be configured to couple CM 130 with a different one of the k OM 140s.

In some examples, as illustrated in FIG. 1, a given IP 110 may include VOQ 112 and IP manager 114. VOQ 112 may be a memory structure arranged to include VOQs configured to at least temporarily store data that has been partitioned into cells. A given VOQ of VOQ 112 may be associated with a destination output port from among OP 150. So for example, if switch 100 included six OP 150's, VOQ 112 may be configured to include six VOQs. Also, as described more below, IP manager 114 may include logic and/or features configured to facilitate the configuration of a route through switch 100 to forward a cell stored in a VOQ separately maintained at each IP 110. IP manager 114 may also include logic and/or feature configured to obtain a count of the number of cells stored at a given VOQ and to determine a total count for the number of cells stored in VOQs that are destined for a given OM 140. As described more below, VOQs storing cells destined for a same given OM 140 may have an identifier referred to as a VOM identifier.

In some examples, as illustrated in FIG. 1, switch 100 may also include IM 120 and CM 130 having an IM manager 124 and a CM manager 134, respectively. As described more below, IM manager 124 and CM manager 134 may include logic and/or features configured to arbitrate and grant matches for links (e.g., $L_I$ 125, $L_C$ 135) interconnecting IM 120, CM 130 and OM 140.

In some examples, as illustrated in FIG. 1, switch 100 illustrates a given OM 140 including CXB 142 and OM manager 144. In some examples, CXB 142 may include queues or cross point buffers ("CXBs") maintained at OM 140. A given CXB may at least temporarily store one or more cells destined for a given OP 150. In some examples, CXBs maintained at an OM 140 may be used to reduce problems caused by cells forwarded from different IP 110s but contending for the same OP 150. CXB 142 may include a CXB associated with a VOQ maintained at an IP 110 that stores a cell destined for a given OP 150. For example, if switch 100 included six IP 110's separately having a VOQ to store a cell destined for a given OP 150, CXB 142 would include six CXBs. Also, as described more below, OM manager 144 may include logic and/or features configured to select a CXB containing a cell to forward to a given OP 150.

In some examples, a given OP 150 may include logic and/or features configured to reassemble cells that were partitioned at IP 110. The logic and/or features of the given OP 150 are not shown. But the logic and/or features configured to reassemble cells are mentioned to indicate that this disclosure contemplates possible reassembly of partitioned cells after cells have been forwarded from a CXB maintained at a given OM 140.

TABLE 1 includes example descriptions for the variables depicted in FIG. 1.

TABLE 1 n = the number of IP 110 and OP 150 for each IM 120 and OM 140, respectively;
k = the number of IM 120s, as well as the number of OM 140s;
m = the number of CM 130s;
IM(i) = the $i^{th}$ IM 120, where $0 \leq i \leq k - 1$;
CM(r) = the $r^{th}$ CM 130, where $0 \leq r \leq m - 1$;
OM(j) = the $j^{th}$ OM 140, where $0 \leq j \leq k - 1$;
IP(i, g) = the $(g + 1)^{th}$ IP 110 at IM(i), where $0 \leq g \leq n - 1$;
OP(j, h) = the $(h + 1)^{th}$ OP 150 at OM(j), where $0 \leq h \leq n - 1$;
$L_{IP}$ (i, g) = the link between IP(i, g) and IM(i);
$L_I$ = (i, r) = the link between IM(i) and CM(r);
$L_C$ = (r, j) = the link between CM(r) and OM(j);
VOQ(i, g, j, h) = VOQ maintained at IP 110 having an identifier of IP(i, g), the VOQ to store a cell destined for OP 150 having an identifier of OP(j, h);
VOM(i, g, j) = VOM maintained at IP 110 having an identifier of IP(i, g), the VOM associated with a total cell count for one or more cells stored in VOQs, the one on more cells destined for an OP 150 coupled to an OM 140 having an identifier of OM(j); and
CXB(i, g, j, h) = CXB maintained at OM 140 that stores cells received from a VOQ(i, g, j, h) with a destination OP 150 having an identifier of OP(j, h).

Figure 2:
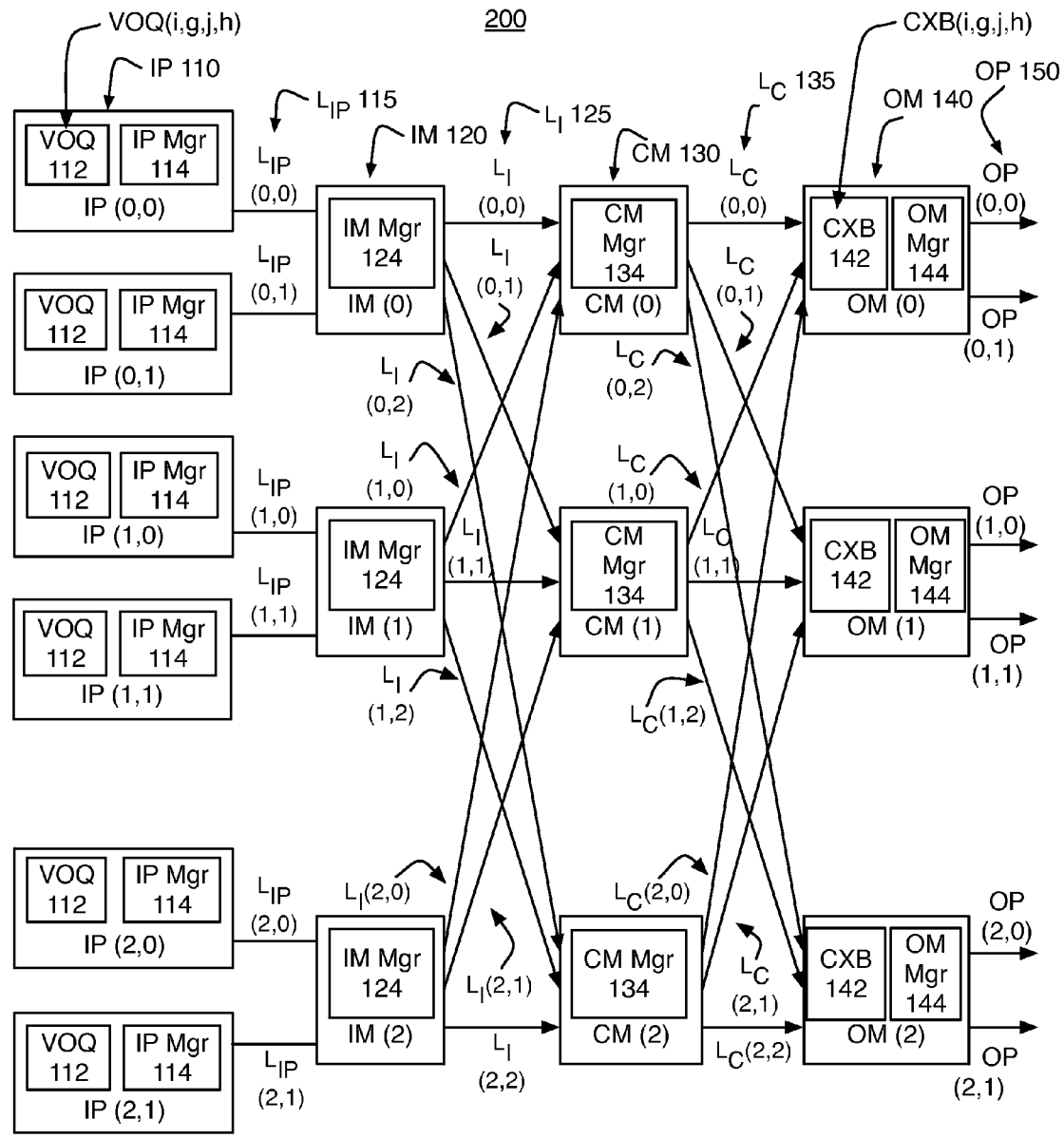
FIG. 2 illustrates an example three-stage Clos-network packet switch including a fixed number of ports and modules.

FIG. 2 illustrates an example three-stage Clos-network packet switch 200 with a fixed number of ports and modules, arranged in accordance with the present disclosure. Example switch 200 includes a similar architecture as described for switch 100 illustrated in FIG. 1. But example switch 200 has fixed values for variables n, k, and m. The fixed values, for example, are n=2, k=3 and m=3. Since, as mentioned above, N=(n*k), N=6, switch 200 is therefore illustrated in FIG. 2 as including six IP 110s and six OP 150s. Also, since k=3 and m=3, switch 200 is illustrated as including three IM 120s, three CM 130s and three OM 140s. FIG. 2 also depicts identifiers for elements based on the fixed values of n=2, k=3 and m=3 and using the example variable descriptions shown in TABLE 1 above. Not depicted in FIG. 2 are identifiers for VOQ(i,g,j,h), VOM(i,g,j) and CXB(i,g,j,h). Identifiers for these three elements are depicted in subsequent figures.

Figure 3:
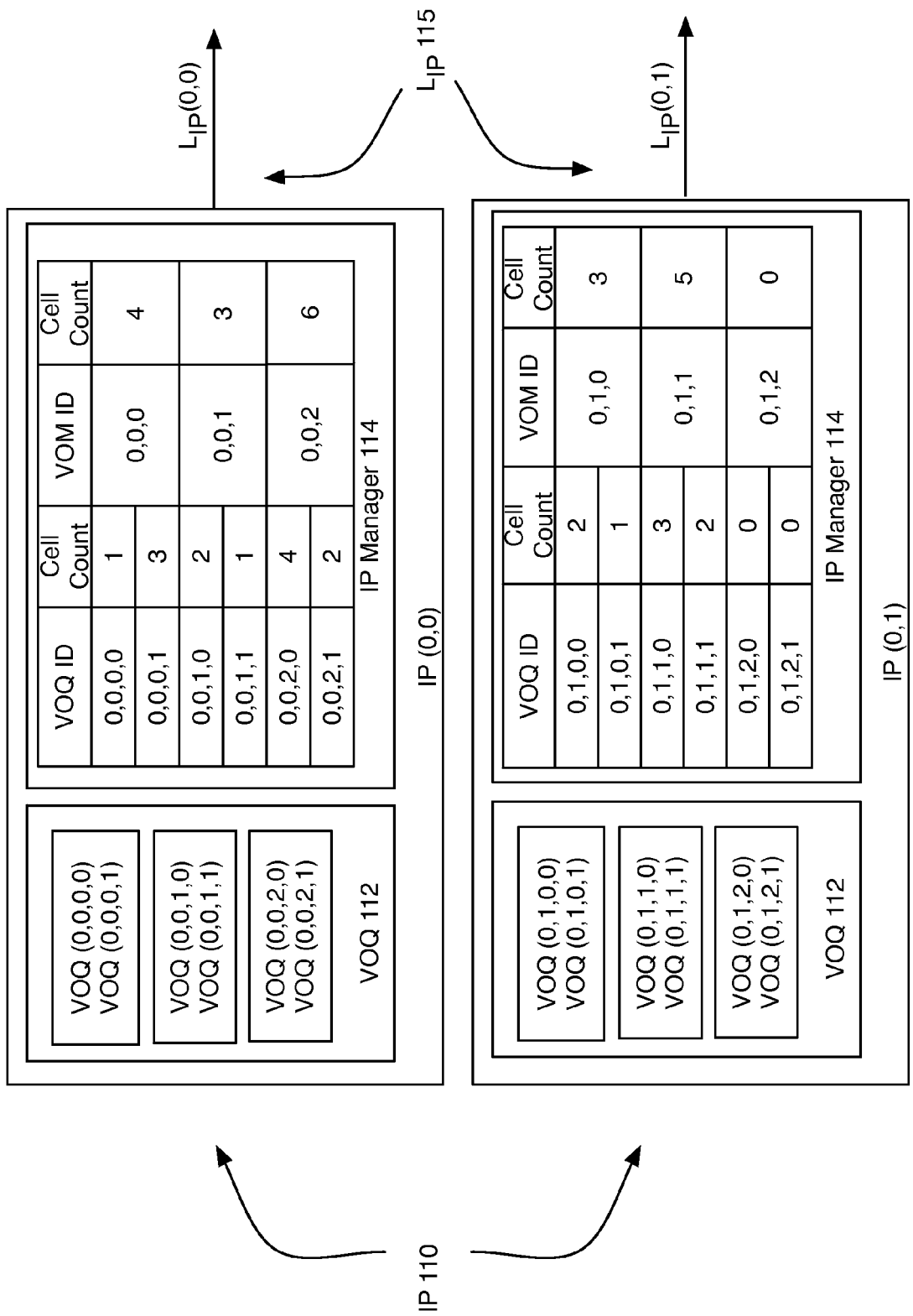
FIG. 3 illustrates a block diagram of an example of two queued input ports for the three-stage Clos-network packet switch including the fixed number of ports and modules.

FIG. 3 illustrates a block diagram of an example of two queued input ports (e.g., IP 110s for switch 200) including a fixed number of ports and modules, arranged in accordance with the present disclosure. As illustrated in FIG. 3, the example IP 110s include input ports with identifiers IP(0,0) and IP(0,1) having $L_{IP}$ 115 with identifiers $L_{IP}$(0,0) and $L_{IP}$(0,1), respectively. FIG. 3 also depicts examples of VOQ identifiers for VOQs for VOQ 112 maintained at IP(0,0) and IP(0,1).

As mentioned above, a VOQ maintained at an IP 110 may be associated with a given OP 150 and there are n*k=6 OP 150s in switch 200. So as illustrated in FIG. 3, VOQ 112 for IP(0,0) may include six VOQs and VOQ 112 for IP(0,1) may also include six VOQs. A VOQ included in a VOQ 112, for example, may have an identifier to associate the VOQ with a given OM 140 coupled to a given OP 150. Since switch 200 depicts two OP 150s coupled to a given OM 140, an OP 150 may include two VOQ identifiers associated with a given OM 140. For example, VOQ identifiers VOQ(0,0,0,0) and VOQ(0,0,0,1) may be maintained at IP(0,0) and may be associated with OP(0,0) and OP(0,1), respectively. As illustrated in FIG. 2, OP(0,0) and OP(0,1) may both be coupled to OM(0). As a result of OP(0,0) and OP(0,1) being coupled to OM(0), VOQ(0,0,0,0) and VOQ(0,0,0,1) are associated with OM(0). As described more below, VOQ(0,0,0,0) and VOQ(0,0,0,1) may be further associated with a VOM identifier that indicates an association with OM(0).

In some examples, as illustrated in FIG. 3, IP manager 114 for IP(0,0) and IP manager 114 for IP(0,1) may separately maintain a cell count table 314. As mentioned above, an IP manager 114 may include logic and/or feature configured to obtain a count of the number of cells stored at a given VOQ. Cell count table 314 may be at least temporarily stored in a memory accessible to an IP manager 114. As illustrated in FIG. 3, cell count table 314 includes a cell count for the six VOQs separately maintained at IP(0,0) and IP(0,1). IP managers 114 for all IP 110s may also separately maintain a cell count table 314.

As illustrated in FIG. 3, cell count table 314 may also include VOM identifiers associated with pairs of VOQs separately maintained at IP(0,0) and IP(0,1). In some examples, as mentioned in TABLE 1 above, a VOM identifier includes an indication of the IP 110 where the VOM is maintained. TABLE 1 also mentions that a VOM identifier also includes an indication of the OM 140 coupled to a cell destination OP 150. So, for example, a VOM included in cell count table 314 for IP(0,0) having an identifier of VOM(0,0,0) would be associated with VOQs having cells destined for an OP 150 coupled to OM(0).

In some examples, IP manager 114 for IP(0,0) and IP manager 114 for IP(0,1) may separately obtain a cell count for data partitioned into cells and stored in VOQs maintained at IP(0,0) and IP(0,1). As depicted in FIG. 3, cell count table 314 maintained at IP(0,0) and cell count table 314 maintained at IP(0,1) indicate example cell counts for the VOQs maintained at IP(0,0) and IP(0,1) and also indicate example cell counts for the VOMs associated with the VOQs maintained at IP(0,0) and IP(0,1). For example, cell count table 314 maintained at IP(0,0) may indicate that VOQ(0,0,2,0) has a cell count of 3 and VOQ(0,0,2,1) has a cell count of 2. Since VOM(0,0,2) is associated with VOQ(0,0,2,0) and VOQ(0,0,2,1), cell count table 314 indicates that VOM(0,0,2) has an example total cell count of 5.

Figure 4:
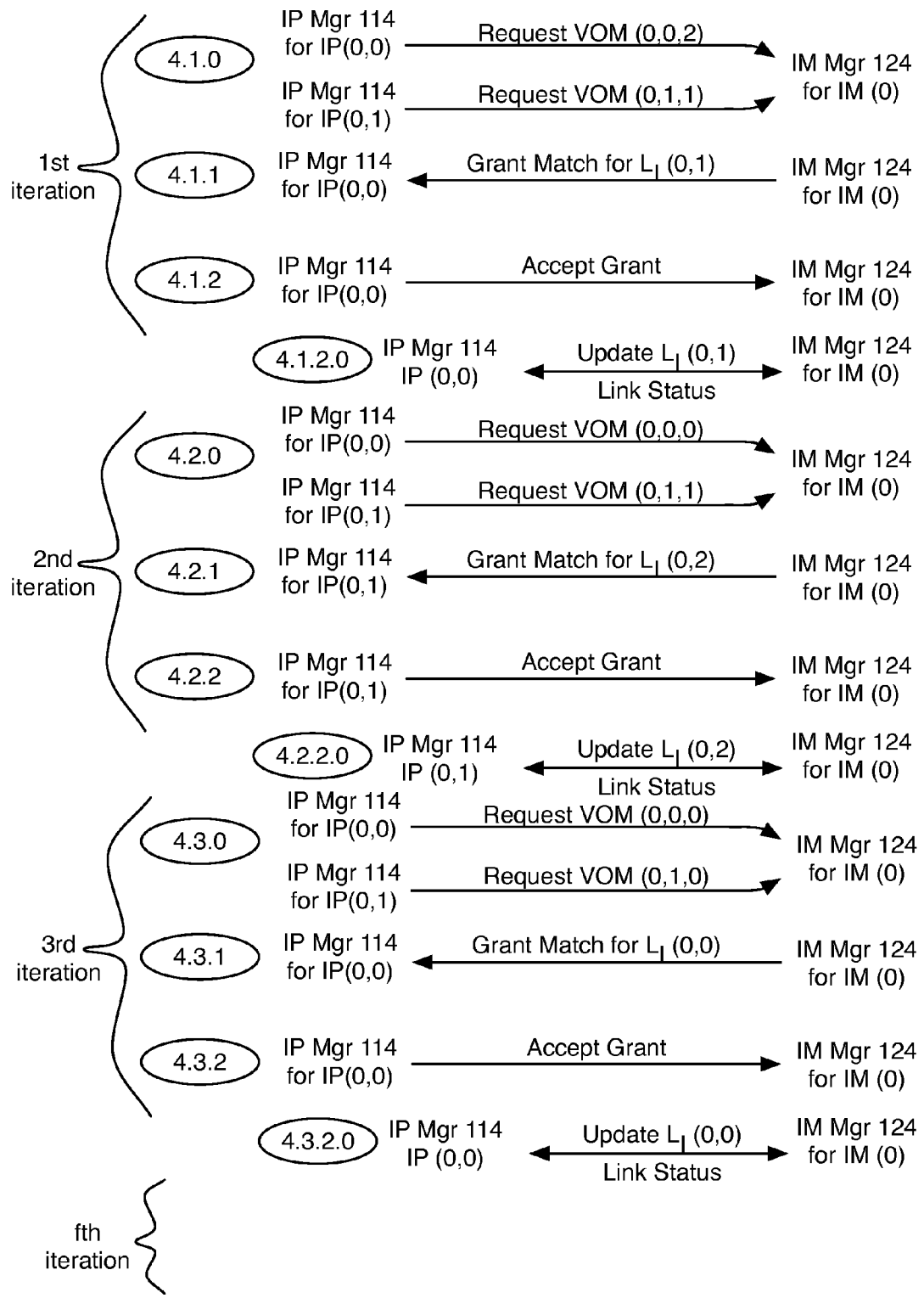
FIG. 4 illustrates an example process diagram for matching a link between an input module and central modules.

FIG. 4 illustrates an example process diagram for matching a link between an IM 120 and CM 130s, in accordance with the present disclosure. In some examples, the process diagram is implemented using the example switch 200 depicted in FIG. 2 and the example portions of switch 200 at IP(0,0) and IP(0,1) depicted in FIG. 3. Although the process shown in FIG. 4 refers to just IP(0,0) and IP(0,1) depicted in FIG. 3, other pairs of IP 110 (e.g., IP(1,0) and IP(1,1)) may go through a similar matching process. For simplicity purposes, the illustrated matching process is described from the perspective of IP 110 having IP(0,0) and IP(0,1).

As shown in FIG. 4, the process may include a first iteration a second iteration and an nth iteration, where n may equate to the number of IP 110's coupled to an IM 120. As mentioned above, n=2 for switch 200, so first and second may apply to example switch 200. However, in other example switches with a n>2, additional iterations may occur until match requests are addressed (e.g., granted and accepted), available links are matched between IM(0) and CM 130s or until other constraints (e.g., time limits) end the matching process.

Starting at example process 4.1.0 (Request VOM(0,0,2); Request VOM(0,1,1)), an IP manager 114 for IP(0,0) and an IP manager 114 for IP(0,1) may separately place a request to match a link between IM(0) and any one of the three CM 130s. As shown in FIG. 2, these links may include $L_f$(0,0) to CM(0), $L_f$(0,1) to CM(2) and $L_f$(0,2) to CM(3). The separate requests may indicate a cell count for a VOM at IP(0,0) and a cell count for a VOM at IP(0,1) that were determined to have the highest cell counts (ties broken arbitrarily). For example, as shown in FIG. 3, cell count table 314 maintained by IP manager 114 for IP(0,0) may indicate that VOM(0,0,2) has the largest cell count. Since VOM(0,0,2) may have the largest cell count for a request, a request to match a link for VOM(0,0,2) may be placed by the IP manager 114 for IP(0,0) as illustrated in FIG. 4. FIG. 3 also shows that the example cell count table 314 maintained by the IP manager 114 for IP(0,1) indicates that VOM(0,1,1) has the largest cell count. Since VOM(0,1,1) has the largest cell count, a request to match a link for VOM(0,1,1) may be placed by IP manager 114 for IP(0,1) as illustrated in FIG. 4.

In some examples, the request may be placed to an IM manager 124 for IM(0). The IM manager 124 for IM(0) may include logic and/or features configured to compare the cells count separately indicated in the requests for VOM(0,0,2) and VOM(0,1,1) and then determine which of the requests indicates the largest or highest cell count (ties broken arbitrarily). The IM manager 124 for IM(0) may also include logic and/or features configured to determine whether any of the links between IM(0) and the three CM 130s of switch 200 are available for matching (e.g., at least some of the links are not currently matched to other requests or at least some of the links are functional, operational, active, etc.).

Moving to example process 4.1.1 (Grant Match for $L_f$(0,1)), the IM manager 124 for IM(0) has determined that the request for VOM(0,0,2) received from IP manager 114 for IP(0,0) indicates the largest cell count (ties broken arbitrarily). Also in this example, the IM manager 124 for IM(0) has determined that link $L_f$(0,1) is available. Because link $L_f$(0,1) is available, as illustrated in FIG. 4, the IM manager 124 for IM(0) may send a grant for a match to link $L_f$(0,1) to IP manager 114 for IP(0,0).

Continuing to example process 4.1.2 (Accept Grant), the IP manager 114 for IP(0,0) may accept the grant to match link $L_f$(0,1) to VOM(0,0,2). Then moving to example process 4.1.2.0 (Update Link Status for $L_I(0,1)$), the IP manager 114 for IP(0,0) or IM manager 124 for IM(0) may update a link status for link $L_I(0,1)$. This link status for link $L_I(0,1)$ may include a table and/or registers maintained in a memory or memories accessible to the IP manager 114 for IP(0,0) and/or the IM manager 124 for IM(0). The table and/or registers may include separate matched/unmatched status indicators for each of the three links coupling IM(0) to the three CM 130s and may also include VOM information for matched links (e.g., VOM identifier including a cell count). In some examples, the matched link status for link $L_I(0,1)$ may be updated so that the table and/or registers maintained in a memory or memories accessible may indicate that link $L_I(0,1)$ is matched to VOM(0,0,2).

Moving to the second iteration at example process 4.2.0 (Request VOM(0,1,1)), an IP manager 114 for IP(0,1) may place another request to match a link between IM(0) and any one of the three CM 130s. The other request may indicate a cell count for an unmatched VOM at IP(0,1) that was determined to have the highest cell count (ties broken arbitrarily). For example, FIG. 3 shows that the cell count table 314 maintained by the IP manager 114 for IP(0,1) may indicate that VOM(0,1,1) still has the largest cell count for an unmatched request. Since VOM(0,1,1) may still have the largest cell count for an unmatched request at IP(0,1), a request for VOM(0,1,1) may be placed by IP manager 114 for IP(0,1) as illustrated in FIG. 4.

Moving to example process 4.2.1 (Grant Match for $L_I(0,2)$), the IM manager 124 for IM(0) may determine availability of any remaining unmatched links to CM 130's. This determination of availability may include accessing the memory maintaining the table and/or registers that was updated at process 4.1.2.0. Since the table and/or registers may indicate the status of link $L_I(0,1)$ as matched, links $L_I(0,0)$ and $L_I(0,2)$ may be the only available links. As shown in FIG. 4, the IM manager 124 for IM(0) may determine that link $L_I(0,2)$ to CM(2) is available and sends a grant for a match to link $L_I(0,2)$ to IP manager 114 for IP(0,1).

Continuing to example process 4.2.2 (Accept Grant), the IP manager 114 for IP(0,1) may accept the grant to match link $L_I(0,2)$ to VOM(0,1,1). Then continuing to example process 4.2.2.0 (Update Matched Link Status for $L_I(0,2)$), the IP manager 114 for IP(0,1) or the IM manager 124 for IM(0) may update a matched link status for link $L_I(0,2)$. The update of the match link status for link $L_I(0,2)$ may occur in a similar way as described above for example process 4.1.2.0 (e.g., update a table and/or registers maintained in a memory accessible to IP manager 114 for IP(0,0) and/or IM manager 124 for IM(0)).

Figure 5:
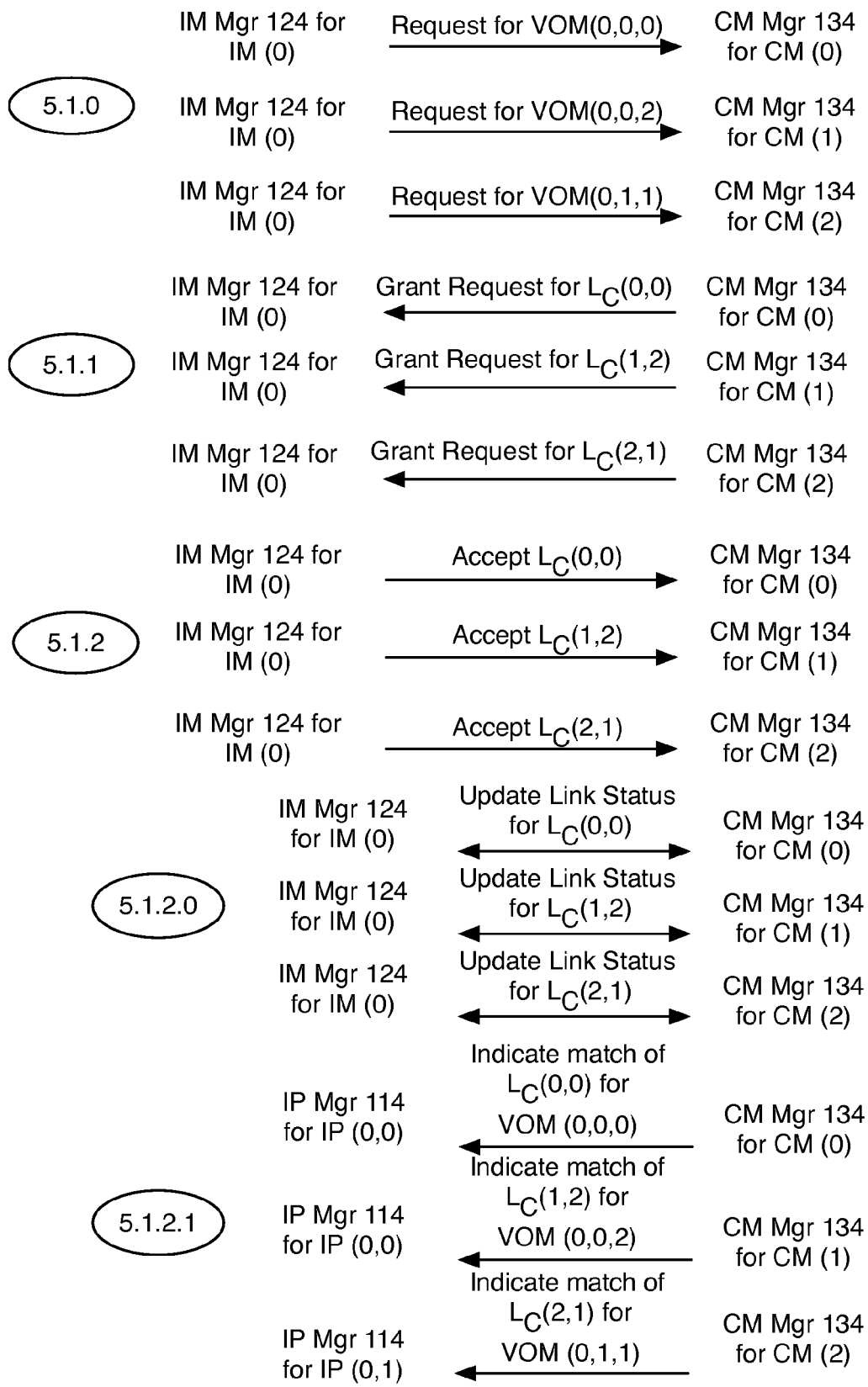
FIG. 5 illustrates an example process diagram for matching a link between central modules and output modules.

FIG. 5 illustrates an example process diagram for matching a link between CM 130s and OM 140s, in accordance with the present disclosure. Similar to FIG. 4, in some examples, the process diagram of FIG. 5 is implemented using the example switch 200 depicted in FIG. 2 and the example portions of switch 200 at IP(0,0) and IP(0,1) depicted in FIG. 3. Although the process shown in FIG. 5 refers to just IP(0,0) and IP(0,1) depicted in FIG. 3, other pairs of IP 110 (e.g., IP(1,0) and IP(1,1)) may go through a similar matching process. For simplicity purposes, only the matching process from the perspective of IP(0,0) and IP(0,1) are described.

In some examples, starting at process 5.1.0 (Request for VOM(0,0,2)), the IM manager 124 for IM(0) may place or forward a request to match a link coupled between CM(1) and OM(2). The request, for example, may be to establish a second link to forward data partitioned into cells and stored in VOQs associated with VOM(0,0,2). As described above for FIG. 4, for example, the first link was matched to link $L_I(0,1)$. Further, as described above for FIG. 3, VOM(0,0,2) may include a cell count for a pair of VOQs maintained at IP(0,0) that are associated with a pair of OP 150s (OP(2,0) and OP(2,1)) that are coupled to OM(2). Since switch 200 may include a single link $L_C(1,2)$ between CM(1) and OM(2), the IM manager 124 for IM(0) may place or forward the request for matching link $L_C(1,2)$ to CM manager 134 for CM(1).

In some examples, also starting at process 5.1.0 (Request Link for VOM(0,1,1), the IM manager 124 for IM(0) may place or forward a request to match a link between CM(2) and OM(1). The request, for example, may be to establish a second link to forward data partitioned into cells and stored in VOQs associated with VOM(0,1,1). As described above for the example in FIG. 4, the first link was matched to link $L_I(0,2)$. Further, as described above for FIG. 3, VOM(0,1,1) may include a cell count for a pair of VOQs maintained at IP(0,1) that are associated with a pair of OP 150s (OP(1,0) and OP(1,1)) that are coupled to OM(1). Since switch 200 may include a single link $L_C(2,1)$ between CM(2) and OM(1), the IM manager 124 for IM(0) may place or forward the request for matching link $L_C(2,1)$ to CM manager 134 for CM(2).

Moving to example process 5.1.1 (Grant Request $L_C(1,2)$), the CM manager 134 for CM(1) may include logic and/or features configured to determine whether $L_C(1,2)$ is available for matching and determining which request for a match to link $L_C(1,2)$ has the greatest cell count (ties broken arbitrarily). For process 5.1.1, the request for VOM(0,0,2) placed or forwarded from the IP manager 124 for IM(0) may indicate the largest cell count. Also, the CM manager 134 for CM(1) may have determined that link $L_C(1,2)$ to OM(2) is available. As a result of VOM(0,0,2) having the largest cell count and link $L_C(1,2)$ being available, the CM manager 134 for CM(1) may send a grant for a match to link $L_C(1,2)$ to the IM manager 124 for IM(0) as illustrated in FIG. 5.

Also at process 5.1.1 (Grant Request $L_C(2,1)$), the CM manager 134 for CM(2) may include logic and/or features configured to determine whether $L_C(2,1)$ is available for matching and determining which request for a match to link $L_C(2,1)$ has the greatest cell count (ties broken arbitrarily). For this example, the request for VOM(0,1,1) placed or forwarded from the IP manager 124 for IM(0) indicates the largest cell count. Also, the CM manager 134 for CM(2) may have determined that link $L_C(2,1)$ to OM(1) is available. As a result of VOM(0,1,1) having the largest cell count and link $L_C(2,1)$ being available, the CM manager 134 for CM(2) may send a grant for a match to link $L_C(2,1)$ to the IM manager 124 for IM(0) as illustrated in FIG. 5.

Continuing to example process 5.1.2 (Accept $L_C(1,2)$), the IM manager 124 for IM(0) may accept the grant for link $L_C(1,2)$ from the CM manager 134 for CM(1) to match link $L_C(1,2)$. Then moving to example process 5.1.2.0 (Update Link Status for $L_C(1,2)$), the IM manager 124 for IM(0) and/or the CM manager 134 for CM(1) may update a link status for link $L_C(1,2)$. This link status may be indicated in a table and/or registers maintained in a memory accessible to the IM manager 124 for IM(0) and/or the CM manager 134 for CM(1). The table and/or registers, for example, would indicate that link $L_C(1,2)$ is matched to VOM(0,0,2). Moving to example process 5.1.2.1 (Indicate Match for $L_C(1,2)$), the IM manager 124 for IM(0) may indicate to an IP manager 114 for IP(0,0) that the second link has been matched. As illustrated in FIG. 5 for process 5.1.2.1, the IM manager 124 for IM(0) may indicate to the IP manager 114 for IP(0,0) that link $L_C(1,2)$ has been matched for VOM(0,0,2).

Also at process 5.1.2 (Accept $L_C(2,1)$), the IM manager 124 for IM(0) accepts the grant for link $L_C(2,1)$ from the CM manager 134 for CM(2) to match link $L_C(2,1)$. Then moving to example process 5.1.2.0 (Update Link Status for $L_C(2,1)$), the IM manager 124 for IM(0) or the CM manager 134 for CM(2) may update a link status for link $L_C(2,1)$. This link status may be indicated in a table and/or memory maintained in a memory accessible to the IM manager 124 for IM(0) and/or the CM manager 134 for CM(2). The table and/or registers, for example, would indicate that link $L_C(2,1)$ is matched to VOM(0,1,1). Moving to example process 5.1.2.1 (Indicate Match for $L_C(2,1)$ for VOM(0,1,1)), the IM manager 124 for IM(0) may indicate to an IP manager 114 for IP(0,1) that the second link has been matched. As illustrated in FIG. 5 for process 5.1.2, the IM manager 124 for IM(0) may indicate to the IP manager 114 for IP(0,1) that link $L_C(2,1)$ has been matched for VOM(0,1,1).

Figure 6:
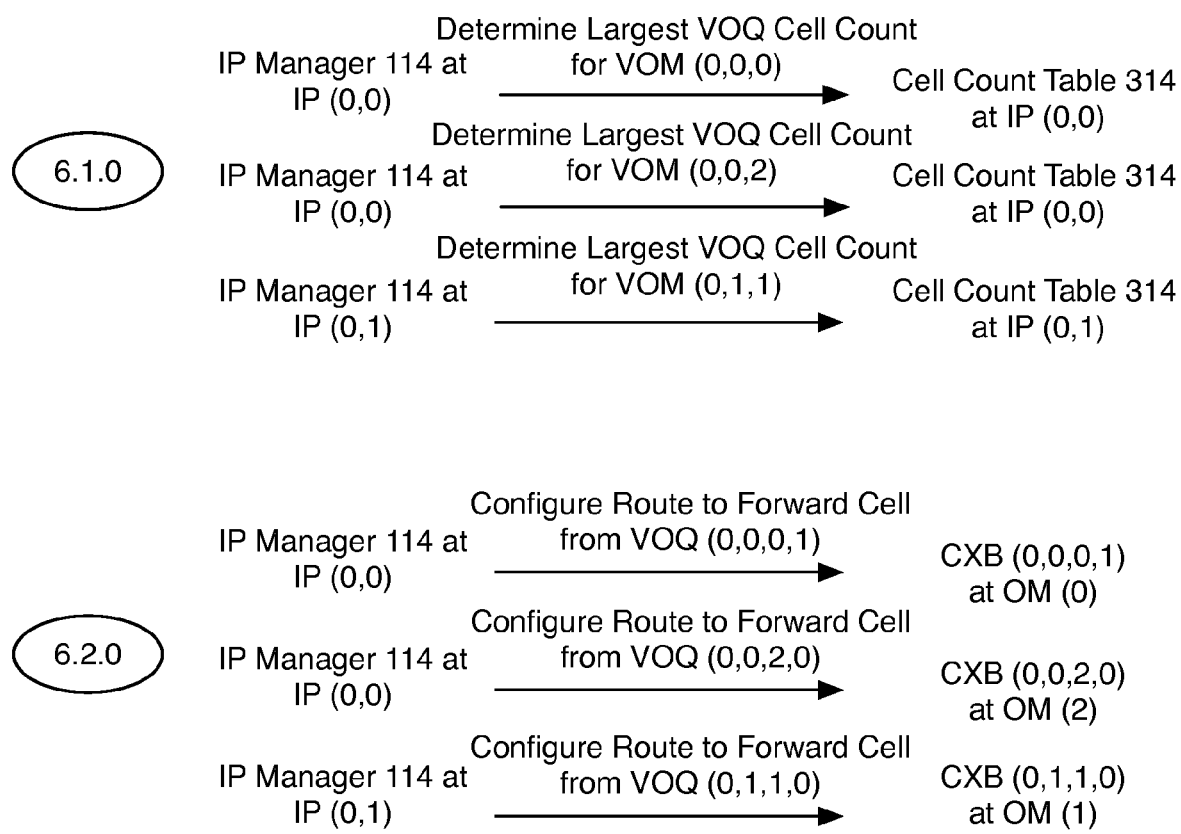
FIG. 6 illustrates an example process diagram for configuring a route to forward a cell to an output module.

FIG. 6 illustrates an example process diagram for configuring a route to forward a cell from a VOQ maintained at an IP 110 to an OM 140, in accordance with the present disclosure. The process diagram of FIG. 6 is implemented using the example switch 200 depicted in FIG. 2 and the example portions of switch 200 at IP(0,0) and IP(0,1) depicted in FIG. 3. In some examples, as described for FIG. 4 and FIG. 5, links between IM(0) and CM(0) and between CM(0) and OM(0) have been matched for VOM(0,0,0). Further, links between IM(0) and CM(1) and between CM(1) and OM(2) have been matched for VOM(0,0,2). Finally, links between IM(0) and CM(2) and between CM(1) and OM(2) have been matched for VOM(0,1,1).

Starting at example process 6.1.0 (Determine Largest VOQ Cell Count for VOM(0,0,2)), the IP manager 114 for IP(0,0) may utilize a similar process as described above for VOM(0,0,0) to determine that the largest VOQ cell count for VOM(0,0,2) is a cell count associated with VOQ(0,0,2,0).

Also at process 6.1.0 (Determine Largest VOQ for VOM (0,1,1)), the IP manager 114 for IP(0,1) may utilize a similar process as described above for VOM(0,0,0) to determine that the largest VOQ cell count for VOM(0,1,1) is VOQ(0,1,1,0).

Continuing to example process 6.2.0 (Configure Route to Forward a Cell From VOQ(0,0,2,0)), the IP manager 114 for IP(0,0) may configure a route to forward a cell stored in VOQ(0,0,2,0) to CXB(0,0,2,0) maintained at OM(2). So as illustrated in the example processes of FIG. 6, the IP manager 114 for IP(0,0) may configure a route to forward a cell from VOQ(0,0,2,0) to CXB(0,0,2,0).

In some examples, the route may be configured through switch 200 such that the IP manager 114 for IP(0,0) may schedule a cell from VOQ(0,0,2,0) to be forwarded to CXB (0,0,0,2) maintained at OM(2) over matched links that were matched as described above for FIG. 4 and FIG. 5. In these examples, the configured route includes link $L_I(0,1)$ between IM(0) and CM(1) and link $L_C(1,2)$ between CM(1) and OM(2).

Also at process 6.2.0 (Configure Route to Forward a Cell From VOQ(0,1,1,0)), the IP manager 114 for IP(0,1) may configure a route to forward a cell stored in VOQ(0,1,1,0) to CXB(0,1,1,0) maintained at OM(1). So as illustrated in the example processes of FIG. 6, the IP manager 114 for IP(0,1) may configure a route to forward a cell from VOQ(0,1,1,0) to CXB(0,1,1,0).

In some examples, the route may be configured through switch 200 such that the IP manager 114 for IP(0,1) may schedule a cell from VOQ(0,1,1,0) to be forwarded to CXB (0,1,1,0) at OM(1) over matched links that were matched as described above for FIG. 4 and FIG. 5. In these examples, the configured route may include link $L_I(0,2)$ between IM(0) and CM(2) and link $L_C(2,1)$ between CM(2) and OM(1).

In some examples, a cell transfer interval is a period of time allocated to forward a cell of partitioned data through at least a portion of switch 200. The period of time, for example, may include the amount of time taken for the cell to be transported from a VOQ maintained at a given IP 110 to a CXB maintained at a given OM 140. The amount of time taken for the cell to be transported from a VOQ maintained at given IP 110 to a CXB maintained at a given OM 140 may consider a worst-case scenario. The worst-case scenario, for example, accounts for longest possible times for routes through switch 200 due to the length of the route or to other factors (e.g., switch congestion). Due to a consideration for the worst-case scenario, an example cell transfer interval should be a period of time that is at least longer that the longest possible time for a configured route through switch 200.

Figure 7:
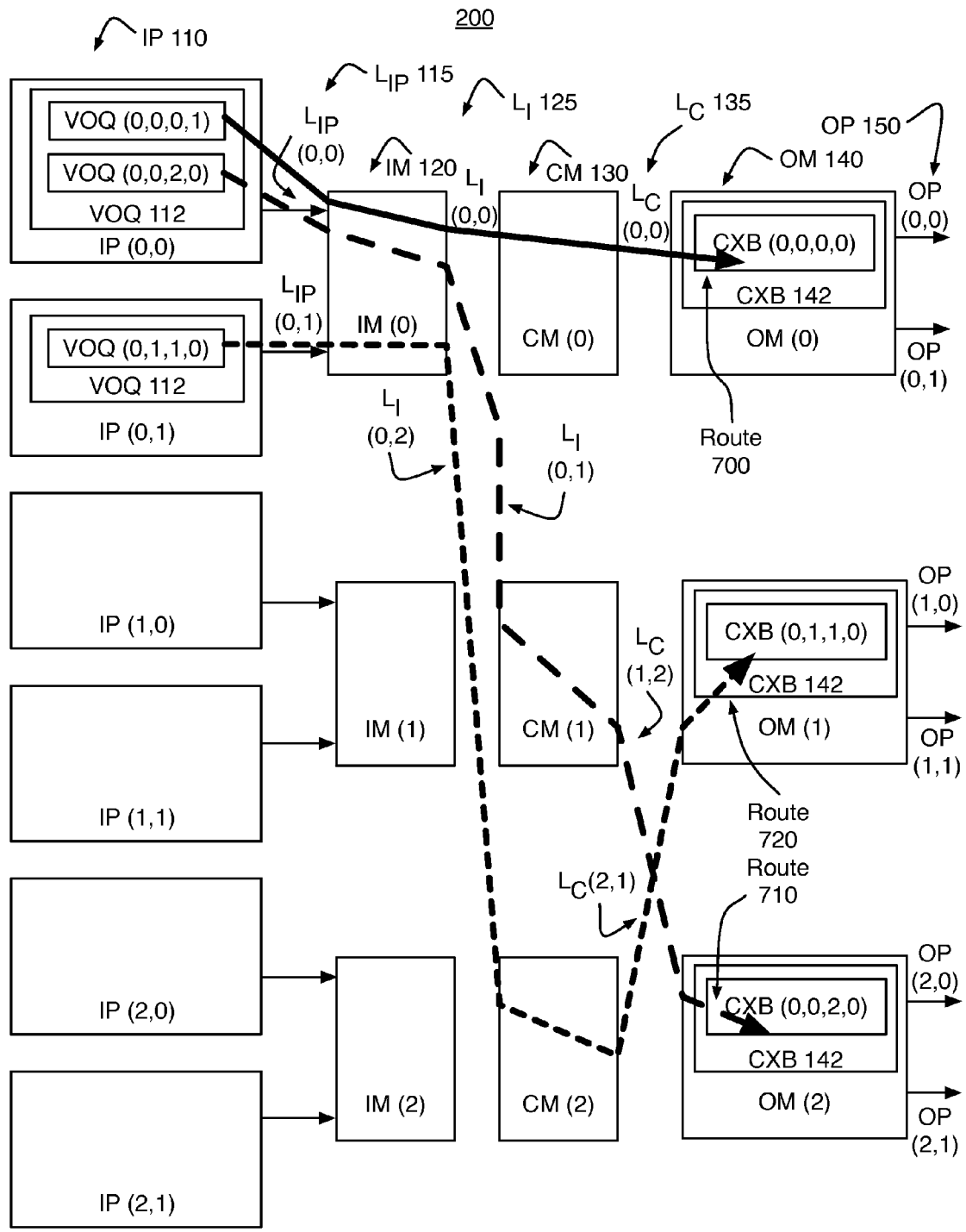
FIG. 7 illustrates example routes configured to forward cells from virtual output queues maintained at input ports.

FIG. 7 illustrates example routes configured through switch 200 to forward cells from VOQs maintained at IP 110, in accordance with the present disclosure. As described above for FIG. 6, the example routes were configured to forward cells from VOQs maintained at IP(0,0) and IP(0,1). The example illustration of FIG. 7 does not include certain elements depicted in FIG. 2 for switch 200. This is to simplify the depiction of the configured routes. As portrayed in FIG. 7, these configured routes include route 710 and route 720. In some examples, route 710 illustrates the configured route for a cell to be forwarded from VOQ(0,0,2,0) to CXB(0,0,2,0) and route 720 illustrates the configured for a cell to be forwarded from VOQ(0,1,1,0) to CXB(0,1,1,0).

Figure 8:
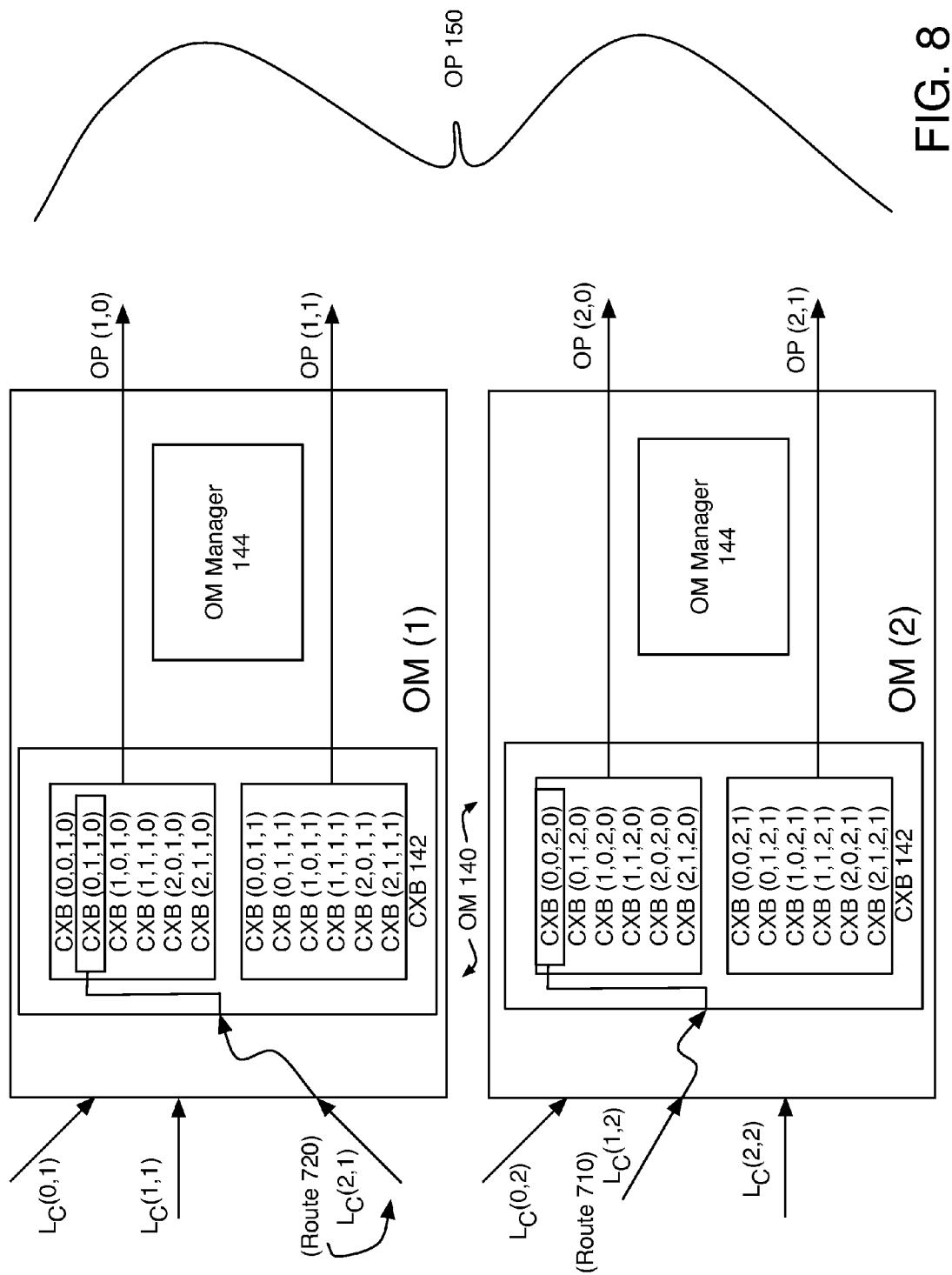
FIG. 8 illustrates example queues maintained at output modules.

FIG. 8 illustrates example CXBs maintained at OM 140 for switch 200, arranged in accordance with the present disclosure. In one example, routes 710 and 720 were configured as described above for FIG. 6 and illustrated in FIG. 7. Thus as shown in FIG. 8, route 720 may couple to OM(1) via $L_C(2,1)$ and may be configured to forward a cell to the CXB with identifier CXB(0,1,1,0) and route 710 may couple to OM(2) via $L_C(1,2)$ and may be configured to forward a cell to the CXB with identifier CXB(0,0,2,0).

In some examples, the OM manager 144s for OM(1) and OM(2) may include logic and/or features configured to select a CXB having a cell destined for a given OP 150 in order to forward the cell to the given OP 150. This selection may be based, in some examples, on implementing one or more arbitration schemes (e.g., round-robin, largest first, oldest first, etc.). Once a CXB is selected, for example, a given cell may be forwarded from the CXB to a destination OP 150 based on a first-in-first-out (FIFO) basis.

In some examples, a cell destined for OP(1,0) has been forwarded via route 720 to CXB(0,1,1,0) maintained at OM(1). For these examples, implementation of an arbitration scheme may result in CXB(0,1,1,0) being selected from among the other five CXBs that may contain cells destined for OP(1,0). As shown in FIG. 8, the other five CXBs that may contain cells destined for OP(1,0) may include CXB(0,0,1,0), CXB(1,0,1,0), CXB(1,1,1,0), CXB(2,0,1,0) and CXB(2,1,1,0). As a result of selecting CXB(0,1,1,0), the OM manager 144 for OM(1) may forward a cell from CXB(0,1,1,0) to OP(1,0).

In some examples, a similar process is followed for a cell destined for OP(2,0) and forwarded via route 710 to CXB(0,0,2,0) maintained at OM(2). For these examples, implementation of an arbitration scheme may result in CXB(0,0,2,0) being selected from among the other five CXBs that may contain cells destined for OP(2,0). As shown in FIG. 8, the other five CXBs that may contain cells destined for OP(1,0) may include CXB(0,1,2,0), CXB(1,0,2,0), CXB(1,1,2,0), CXB(2,0,2,0) and CXB(2,1,2,0). As a result of selecting CXB (0,0,2,0), the OM manager 144 for OM(2) may forward a cell from CXB(0,0,2,0) to OP(2,0).

Figure 9:
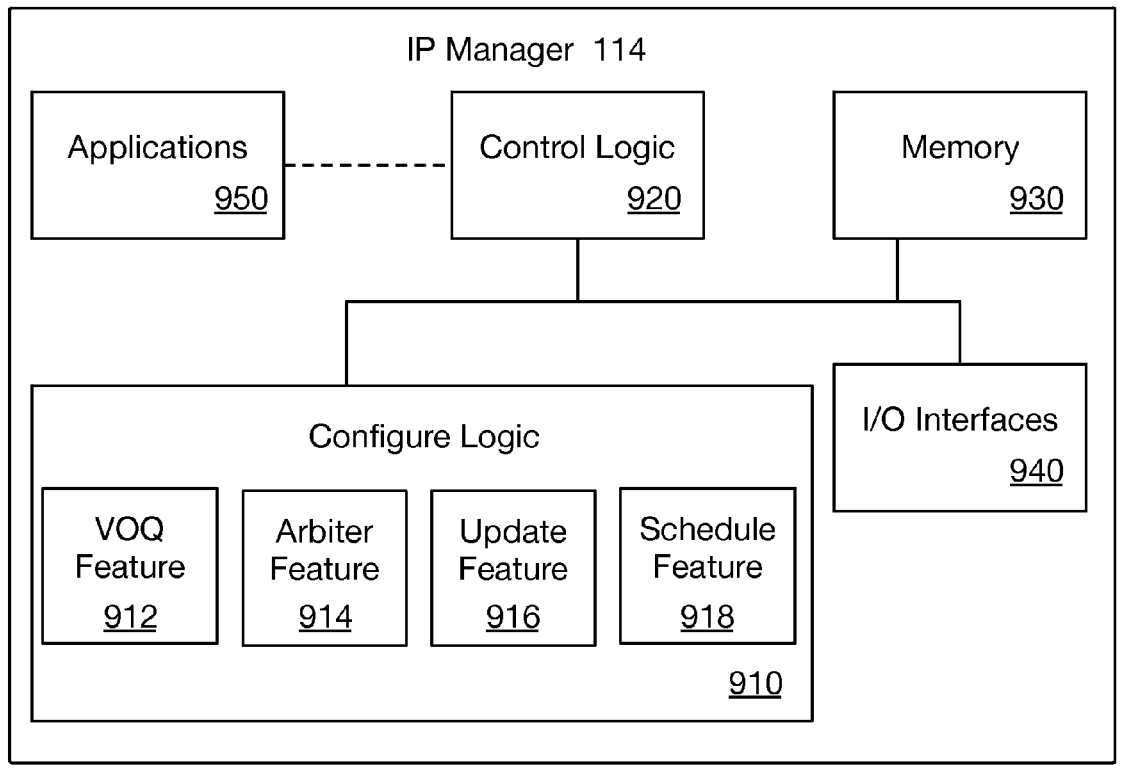
FIG. 9 illustrates a block diagram of an example architecture for an input port manager.

FIG. 9 illustrates a block diagram of an example architecture for IP manager 114 arranged in accordance with the present disclosure. As described above for switch 100 and switch 200 in FIGS. 1 and 2, respectively, IP 110 includes an IP manager 114. In some examples, the IP manager 114 includes one or more features and/or logic configured or arranged to facilitate the configuration of one or more routes through a three-stage Clos-network packet switch such as switch 100 or switch 200. The example IP manager 114 of FIG. 9, may include one or more of a configure logic 910, a control logic 920, a memory 930, input/output (I/O) interfaces 940 and optionally one or more applications 950.

In some examples, the elements portrayed in FIG. 9's block diagram are configured to support or enable IP manager 114 as described in this disclosure. A given IP manager 114 may include some, all or more elements than those depicted in FIG. 9. For example, configure logic 910 and control logic 920 may separately or collectively represent a wide variety of logic device(s) to implement the features of IP manager 114. An example logic device may include one or more of a computer, a microprocessor, a microcontroller, a field programmable gate array (FPGA), an application specific integrated circuit (ASIC), a sequestered thread or a core of a multi-core/multi-threaded microprocessor or a combination thereof. This wide variety of logic device(s) could be located entirely at a given IP 110 or at least a portion of the logic device(s) could be located at other locations of a three-stage Clos-network packet switch (e.g., centrally located, located with IP 110, IM 120, CM 130, OM 140 or a combination thereof).

In some examples, as shown in FIG. 9, configuration logic 910 may include one or more of a VOQ feature 912, an arbiter feature 914, an update feature 916 and a schedule feature 918. Configuration logic 910 may be configured to use one or more of these features to perform operations. Example operations may include one or more of obtaining cell count information for VOQs maintained at an IP 110, arbitrating between the VOQs (e.g., determining largest cell counts), updating link status information for links associated with a route to forward a cell from a VOQ and scheduling a cell to be forwarded via the route.

In some examples, control logic 920 may be configured to control the overall operation of IP manager 114. As mentioned above, control logic 920 may represent any of a wide variety of logic device(s) and may also be configured to operate in conjunction with executable content or instructions. The executable content or instructions may be used by control logic 920 and/or configure logic 910 to implement or activate features or elements of IP manager 114. In some alternate examples, the features and functionality of control logic 920 may be implemented within configure logic 910.

According to some examples, memory 930 may be arranged to store executable content. The executable content may be used by control logic 920 and/or configure logic 910 to implement or activate features or elements of IP manager 114. Memory 930 may also be arranged to temporarily maintain VOQ cell count information, link status and scheduling information obtained by the above mentioned features of configure logic 910.

Memory 930 may include a wide variety of memory media including, but not limited to, one or more of volatile memory, non-volatile memory, flash memory, programmable variables or states, random access memory (RAM), read-only memory (ROM), or other static or dynamic storage media.

In some examples, I/O interfaces 940 may provide an interface via an internal communication medium or link between IP manager 114 and elements resident on or located with a given IP 110 (e.g., VOQ 112). I/O interfaces 940 may include interfaces that operate according to various communication protocols to communicate over the internal communication link (e.g., Inter-Integrated Circuit (I$^2$C), System Management Bus (SMBus) or Serial Peripheral Interface Bus (SPI)). I/O interfaces 940 may also provide an interface between IP manager 114 and elements coupled to an IP 110 such as IM 120. As mentioned above for FIG. 1, IP 110s may couple to these elements via links $L_{IP}$ 115. I/O interfaces 940, for example, include an interface configured to operate according to various communication protocols to allow IP manager 114 to communicate over links $L_{IP}$ 115 (e.g., PCIe, PCI-eXtended (PCI-X), Ethernet, Infiniband, StarFabric, RapidIO, etc.).

In some examples, IP manager 114 includes one or more applications 950 to provide instructions to control logic 920 and/or configure logic 910.

Figure 10:
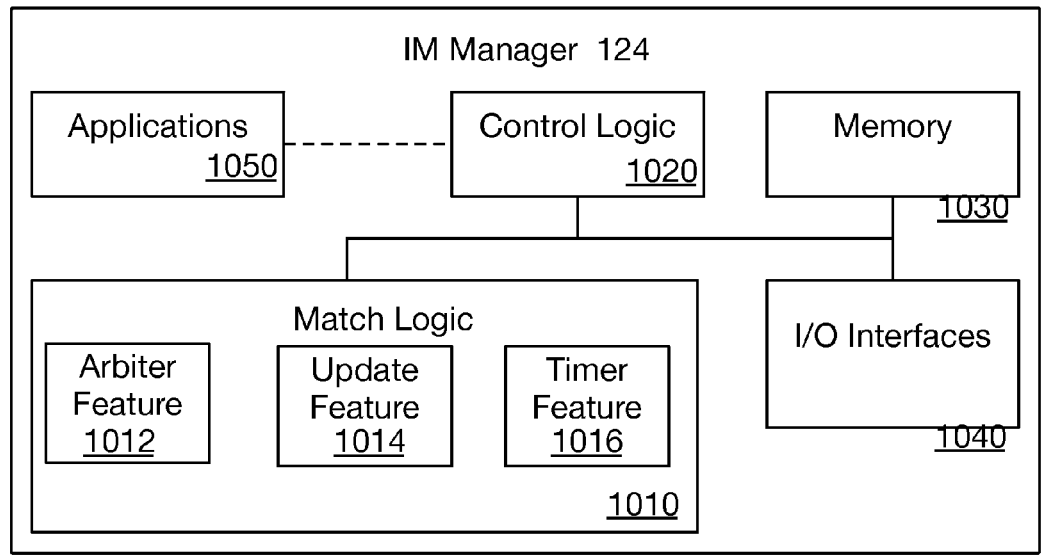
FIG. 10 illustrates a block diagram of an example architecture for an input module manager.

FIG. 10 illustrates a block diagram of an example architecture for an IM manager 124, arranged in accordance with the present disclosure. As described above for switch 100 and switch 200 in FIGS. 1 and 2, respectively, IM 120 includes an IM manager 124. In some examples, IM manager 124 may include one or more features and/or logic configured to arbitrate between requests to match a link, grant requests, update status information for links $L_I$ 125 and $L_c$ 135 and/or determine when a cell transfer interval has ended. The example IM manager 124 of FIG. 10 include one or more of a match logic 1010, a control logic 1020, a memory 1030, input/output (I/O) interfaces 1040 and optionally one or more applications 1050.

In some examples, the elements portrayed in FIG. 10's block diagram are those elements to support or enable IM manager 124 as described in this disclosure. A given IM manager 124 may include some, all or more elements than those depicted in FIG. 10. For example, match logic 1010 and control logic 1020 may separately or collectively represent a wide variety of logic device(s) to implement the features of IM manager 124. As mentioned previously, an example logic device may include one or more of a computer, a microprocessor, a microcontroller, an FPGA, an ASIC, a sequestered thread or a core of a multi-core/multi-threaded microprocessor or a combination thereof. This wide variety of logic device(s) could be located entirely at a given IM 120 or at least a portion of the logic device(s) could be located at other locations of a three-stage Clos-network packet switch (e.g., centrally located, located with IP 110, CM 130, OM 140 or a combination thereof).

In some examples, as shown in FIG. 10, match logic 1010 includes one or more of an arbiter feature 1012, an update feature 1014 and/or a timer feature 1016. Match logic 1010 may be configured to use one or more of these features to perform operations. Example operations may include one or more of arbitrating between requests to match a link, granting requests and/or updating/providing link status information for links $L_I$ 125 between a given IM 120 and CM 130s. These example operations may also include one or more of requesting or forwarding requests for matches to links $L_c$ 135 between CM 130s and OM 140s, updating/providing link status information for links $L_c$ 135 and/or determining when a cell transfer interval has ended (e.g., via use of timer).

In some examples, control logic 1020 may be configured to control the overall operation of IM manager 124. As mentioned above, control logic 1020 may represent any of a wide variety of logic device(s) and may also be configured to operate in conjunction with executable content or instructions. The executable content or instructions may be used by control logic 1020 and/or match logic 1010 to implement or activate features or elements of IM manager 124. In some examples, the features and functionality of control logic 1020 may be implemented within match logic 1010.

According to some examples, memory 1030 may be arranged to store executable content. The executable content may be used by control logic 1020 and/or match logic 1010 to implement or activate features or elements of IM manager 124. Memory 1030 may also be arranged to temporarily maintain or store request information (e.g., VOM identifiers and associated cell counts) and link status information obtained and/or updated by features for match logic 1010 (e.g., in a link status table).

In some examples, memory 1030 may be arranged to include one or more registers to maintain link status information. For example, a register may be separately allocated to each link $L_I$ 125 (e.g., $L_I(0,0)$ to $L_I(k-1,m-1)$) and each link $L_C$ 135 (e.g., $L_C(0,0)$ to $L_C(m-1,k-1)$) to indicate a link's status (e.g., matched or unmatched). Features and/or logic of IM manager 124 may be configured to use an allocated register to determine availability of a link and/or update a link's status. Features and/or logic of other managers (e.g., IP manager 114 or CM manager 134) may also be configured to use an allocated register included in memory 1030 to determine availability of a link and/or update a link's status.

Memory 1030 may include a wide variety of memory media including, but not limited to, one or more of volatile memory, non-volatile memory, flash memory, programmable variables or states, RAM, ROM, or other static or dynamic storage media.

In some examples, I/O interfaces 1040 may provide an interface between IM manager 124 and elements coupled to an IM 120 such as IP 110 and CM 130. As mentioned above for FIG. 1, IM 120 may couple to these elements via links $L_{IP}$ 115 and $L_I$ 125. I/O interfaces 1040, for example, may include an interface configured to operate according to various communication protocols (e.g., PCIe, PCI-eXtended (PCI-X), Ethernet, Infiniband, StarFabric or RapidIO) to allow IM manager 124 to communicate over links $L_{IP}$ 115 and $L_I$ 125.

In some examples, IM manager 124 may include one or more applications 1050 to provide internal instructions to control logic 1020 and/or match logic 1010.

Figure 11:
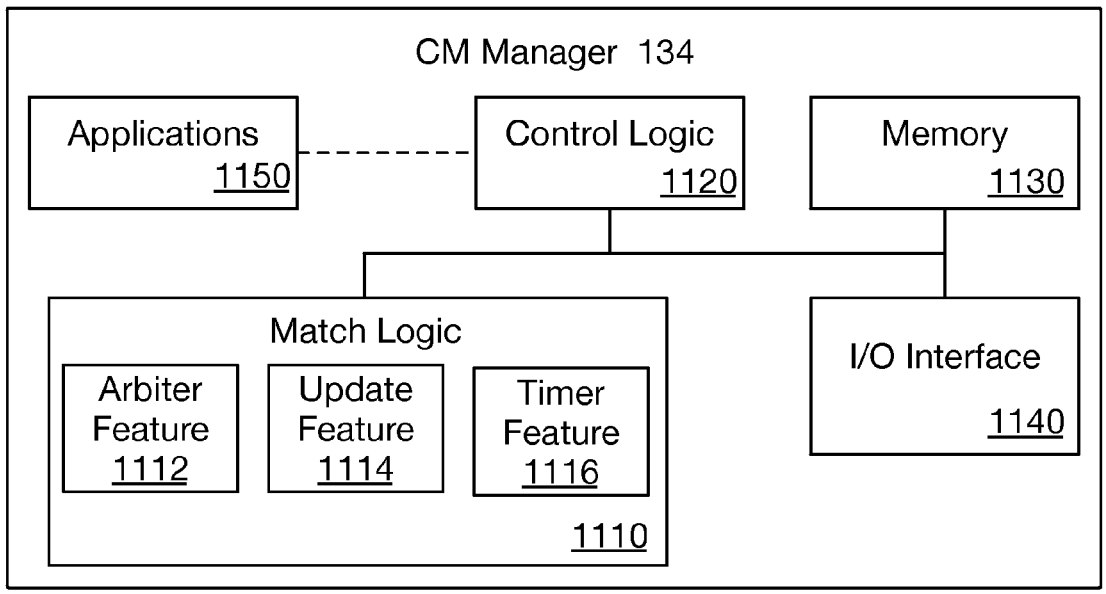
FIG. 11 illustrates a block diagram of an example architecture for a central module manager.

FIG. 11 illustrates a block diagram of an example architecture for a CM manager 134, arranged in accordance with the present disclosure. As described above for switch 100 and switch 200 in FIGS. 1 and 2, respectively, CM 130 includes a CM manager 134. In some examples, CM manager 134 may include features and/or logic configured to arbitrate between requests to match a link, grant matches and update status information for links $L_I$ 125 and/or $L_c$ 135. The example CM manager 134 of FIG. 11 may include one or more of a match logic 1110, a control logic 1120, a memory 1130, input/output (I/O) interfaces 1140 and optionally one or more applications 1150.

In some examples, the elements portrayed in FIG. 11's block diagram may be configured to support or enable CM manager 134 as described in this disclosure. A given CM manager 134 may include some, all or more elements than those depicted in FIG. 11. For example, match logic 1110 and control logic 1120 may separately or collectively represent a wide variety of logic device(s) to implement the features of CM manager 134. As mentioned previously, an example logic device may include one or more of a computer, a microprocessor, a microcontroller, an FPGA, an ASIC, a sequestered thread or a core of a multi-core/multi-threaded microprocessor or a combination thereof. This wide variety of logic device(s) could be located entirely at a given CM 130 or at least a portion of the logic device(s) could be located at other locations of a three-stage Clos-network packet switch (e.g., centrally located, located with IP 110, IM 120, OM 140 or a combination thereof).

In some examples, as shown in FIG. 11, match logic 1110 include one or more of an arbiter feature 1112, an update feature 1114 and a timer feature 1116. Match logic 1110 may be configured to use these features to perform operations. Example operations may include one or more of arbitrating between requests to match a link, granting matches and updating/providing link status information for links $L_I$ 125 and/or $L_c$ 135, updating/providing link status information for links $L_I$ 125 and/or $L_c$ 135 and/or determining when a cell transfer interval has ended (e.g., via use of timer by timer feature 1116).

In some examples, control logic 1120 may be configured to control the overall operation of CM manager 134 and as mentioned above, may represent any of a wide variety of logic device(s) and may also be configured to operate in conjunction with executable content or instructions. The executable content or instructions may be used by control logic 1120 and/or match logic 1110 to implement or activate features or elements of CM manager 134. In some alternate examples, the features and functionality of control logic 1120 may be implemented within match logic 1110.

According to some examples, memory 1130 may be arranged to store executable content. The executable content may be used by control logic 1120 and/or match logic 1110 to implement or activate features or elements of CM manager 134. Memory 1130 may also be configured to temporarily maintain or store request information (e.g., VOM identifiers and associated cell counts) and link status information obtained and/or updated by features of match logic 1110 (e.g., in a link status table).

In some examples, memory 1130 may be arranged to include one or more registers to maintain link status information. For example, a register may be separately allocated to each link $L_I$ 125 (e.g., $L_I(0,0)$ to $L_I(k-1,m-1)$) and each link $L_C$ 135 (e.g., $L_C(0,0)$ to $L_C(m-1,k-1)$) to indicate a link's status (e.g., matched or unmatched). Features and/or logic of CM manager 134 may be configured to use an allocated register to determine availability of a link and/or update a link's status. Features and/or logic of other managers (e.g., IP manager 114 or IM manager 124) may also be configured to use an allocated register included in memory 1130 to determine availability of a link and/or update a link's status.

Memory 1130 may include a wide variety of memory media including, but not limited to, one or more of volatile memory, non-volatile memory, flash memory, programmable variables or states, RAM, ROM, or other static or dynamic storage media.

In some examples, I/O interfaces 1140 may provide an interface between CM manager 134 and elements coupled to an CM 130 such as IM 120 and OM 140. As mentioned above for FIG. 1, CM 130 may couple to these elements via links $L_I$ 125 and $L_C$ 135. I/O interfaces 1140, for example, may include an interface configured to operate according to various communication protocols (e.g., PCIe, PCI-eXtended (PCI-X), Ethernet, Infiniband, StarFabric or RapidIO) to allow CM manager 134 to communicate over links $L_I$ 125 and $L_C$ 135.

In some examples, CM manager 134 may include one or more applications 1150 to provide internal instructions to control logic 1120 and/or match logic 1110.

Figure 12:
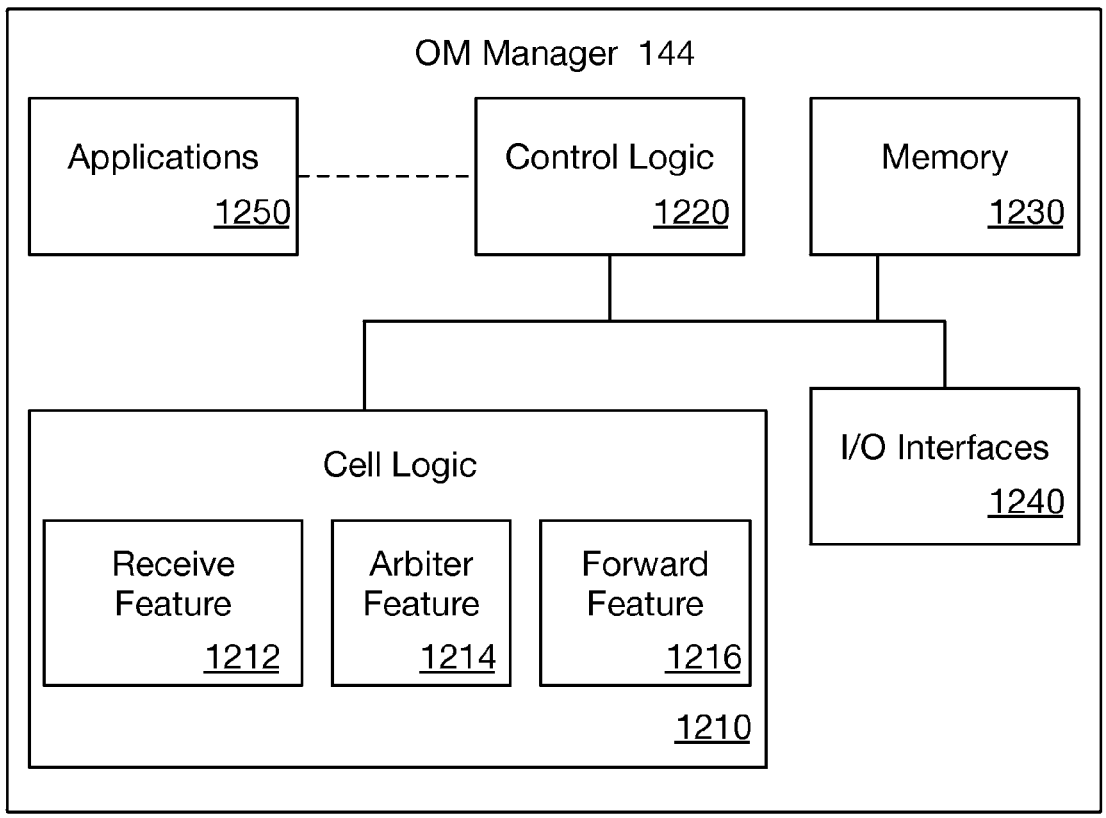
FIG. 12 illustrates a block diagram of an example architecture for output module manager.

FIG. 12 illustrates a block diagram of an example architecture for OM manager 144, arranged in accordance with the present disclosure. As described above for switch 100 and switch 200 in FIGS. 1 and 2, respectively, OM 140 includes an OM manager 144. In some examples, OM manager 144 may include one or more features and/or logic configured to receive cells forwarded from VOQs, arbitrate among CXBs maintained at CXB 142 to determine what cell to forward to a given OP 150 and/or forward the cell to the given OP 150. The example OM manager 144 of FIG. 12 may include one or more of a cell logic 1210, a control logic 1220, a memory 1230, input/output (I/O) interfaces 1240 and optionally one or more applications 1250.

In some examples, the elements portrayed in FIG. 12's block diagram are configured to support or enable OM manager 144 as described in this disclosure. A given OM manager 144 may include some, all or more elements than those depicted in FIG. 12. For example, cell logic 1210 and control logic 1220 may separately or collectively represent a wide variety of logic device(s) to implement the features of OM manager 144. As mentioned previously, an example logic device may include one or more of a computer, a microprocessor, a microcontroller, an FPGA, an ASIC, a sequestered thread or a core of a multi-core/multi-threaded microprocessor or a combination thereof. This wide variety of logic device(s) could be located entirely at a given OM 140 or at least a portion of the logic device(s) could be located at other locations of a three-stage Clos-network packet switch (e.g., centrally located, located with IP 110, IM 120, CM 130 or a combination thereof).

In one example, as shown in FIG. 12, cell logic 1210 may includes one or more of a receive feature 1212, an arbiter feature 1214, and a forward feature 1216. Cell logic 1210 may use these features to perform operations. Example operations may include one or more of receiving cells via links $L_C$ 135 to store received cells in CXBs maintained OM 140, implementing an arbitration policy, and forwarding a cell to a destination OP 150 based on the arbitration policy.

In some examples, control logic 1220 may be configured to control the overall operation of OM manager 144. As mentioned above, control logic 1220 may represent any of a wide variety of logic device(s) and may also be configured to operate in conjunction with executable content or instructions. The executable content or instructions may be used by control logic 1220 and/or cell logic 1210 to implement or activate features or elements of OM manager 144. In some alternate examples, the features and functionality of control logic 1120 may be implemented within cell logic 1110.

According to some examples, memory 1230 may be arranged to store executable content. The executable content may be used by control logic 1220 and/or match logic 1210 to implement or activate features or elements of OM manager 144. Memory 1230 may also temporarily maintain information (e.g., CXB identifiers and associated cell information) obtained by features of cell logic 1210.

Memory 1230 may include a wide variety of memory media including, but not limited to, one or more of volatile memory, non-volatile memory, flash memory, programmable variables or states, RAM, ROM, or other static or dynamic storage media.

In some examples, I/O interfaces 1240 may provide an interface via an internal communication medium or link between OM manager 144 and elements resident on or located with a given OM 140 (e.g., CXB 142). I/O interfaces 1240 may include interfaces configured to operate according to various communication protocols to communicate over the internal communication link (e.g., Inter-Integrated Circuit ($I^2C$), System Management Bus (SMBus), or Serial Peripheral Interface Bus (SPI)). I/O interfaces 1240 may also provide an interface between OM manager 144 and elements coupled to an OM 140 such as CM 130. As mentioned above for FIG. 1, OM 140 may couple to these elements via links $L_C$ 135. I/O interfaces 1240, for example, include an interface configured to operate according to various communication protocols to allow OM manager 144 to communicate over link $L_C$ 135 (e.g., PCIe, PCI-eXtended (PCI-X), Ethernet, Infiniband, StarFabric or RapidIO).

In some examples, OM manager 144 may include one or more applications 1250 to provide internal instructions to control logic 1220 and/or cell logic 1210.

Figure 13:
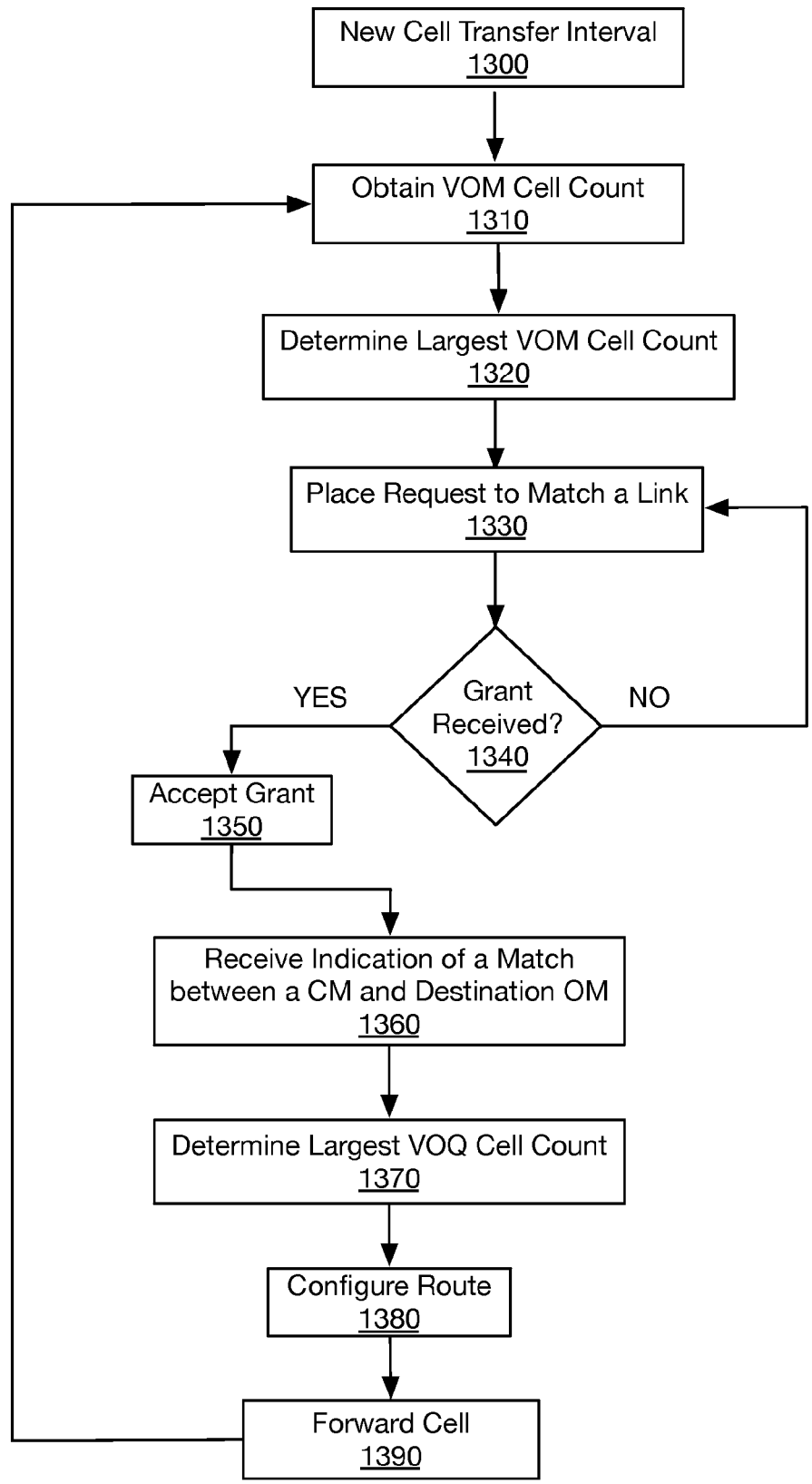
FIG. 13 illustrates a flow chart of example methods for configuring one or more routes through a three-stage Clos-network packet switch.

FIG. 13 illustrates a flow chart of example methods for configuring one or more routes through a three-stage Clos-network packet switch, in accordance with the present disclosure. The same portions of switch 200 as shown in FIGS. 2, 3 and 7, along with the various managers described in FIGS. 9-11, may be used to illustrate the example methods. But the described methods are not limited to only implementations on switch 200 including the various managers described in FIGS. 9-11. The example methods may be implemented on other types of three-stage Clos-network packet switches that may include managers having one or more of the elements depicted in FIGS. 9-11.

Processing beings at block 1300 (New Cell Transfer Interval), where a cell transfer interval has begun. In some examples, the new cell transfer interval indicates that previously matched links for switch 200 may now be available for matching.

Processing continues from block 1300 to block 1310 (Obtain VOM Cell Counts), where cell count information may be obtained. For example, the cell count information may be obtained by VOQ feature 912 of IP manager 114 for an IP 110 (e.g., IP(0,0). The cell count information may be associated with data partitioned into one or more cells and stored in VOQ 112 maintained at the IP 110. The cell count information may include cell counts for pairs of VOQs having cells destined to a given OP 150 coupled to the same OM 140. A pair of VOQs having cells destined to a given OP 150 may be further associated with a VOM identifier. As described above for FIG. 3, a cell count table 314 maintained by an IP manager 114 for an IP 110 may be arranged to include the cell count information. For example, as described above for FIG. 3, a cell count for VOM(0,0,2) may be the total cell count for one or more cells stored in VOQ(0,0,2,0) and VOQ(0,0,2,1) and destined for OM(2).

Processing continues to block 1320 (Determine Largest VOM Cell Count) where the process may determine (e.g., via arbiter feature 914) which VOM has the largest cell count.

Continuing to block 1330 (Place Request to Match a Link), a request may be placed (e.g., via arbiter feature 914) to match a link $L_I$ 125 (e.g., $L_I(0,0)$, $L_I(0,1)$, $L_I(0,2)$) between an IM 120 (e.g., IM(0)) and a CM 130. In some examples, the request indicates the total cell count for a VOM (e.g., VOM (0,0,2)) having the largest total cell count as determined at block 1320. The request is sent, for example, to IM manager 124 for an IM 120 coupled to IP 110 that is the source of the request (e.g., IP(0,0)).

Continuing to decision block 1340 (Grant Received?), the process may determine (e.g., via arbiter feature 914) whether a grant for the request placed at block 1330 has been received. Processing continues from decision block 1340 to block 1350 when a determination is made (e.g., via arbiter feature 914) that a grant has been received. Otherwise, processing continues from decision block 1340 to block 1330 and another request may be placed. In some examples, as described above for FIG. 4, the other request may be part of a second or a nth iteration.

In block 1350 (Accept Grant), a grant for a match for VOM(0,0,2) may be accepted (e.g., by arbiter feature 914) to match the link. The grant, for example, may be for a link $L_f(0,1)$ between IM(0) and CM(1). Based on acceptance of this grant, a link status table (e.g., maintained in memory 930) may be updated (e.g., via update feature 916) to indicate that link $L_f(0,1)$ is matched to a first link to forward a cell stored in one of the VOQs associated with VOM(0,0,2).

Proceeding to block 1360 (Receive Indication of a Match Between CM and Destination OM), an indication that a request to match a second link between CM(1) and OM(2) has been granted may be received (e.g., via IP manager 114 for IP(0,0)). In some examples, the grant to match the second link may be accepted (e.g., via arbiter feature 914 or via a logic and/or features for IM manager 124) to match the second link. Following acceptance, for example, the link status table (e.g., maintained at memory 930) may be updated (e.g., via update feature 916) to indicate that link $L_C(1,2)$ may be matched to a second link to forward a cell stored in one of the VOQs associated with VOM(0,0,2).

Continuing to block 1370 (Determine Largest VOQ Cell Count), the process may determine (e.g., via arbiter feature 914) which VOQ associated with VOM(0,0,2) has the largest cell count.

Continuing to block 1380 (Configure Route), the process may have determined at block 1370 that VOQ(0,0,2,0) associated with VOM(0,0,2) had the largest cell count. In some examples, a route may be configured (e.g., via schedule feature 918). The configured route may be from VOQ(0,0,2,0) to a CXB maintained at OM(2). The CXB maintained at OM(2) may be associated with the destination OP(2,0) for a cell stored in VOQ(0,0,2,0). The CXB, for example may be CXB (0,0,2,0). Configuration may include scheduling a cell to be forwarded to CXB(0,0,2,0) via the first matched link of $L_f(0,1)$ and the second matched link of $L_C(1,2)$.

Continuing to block 1370 (Forward Cell), the process may forward a cell via the configured route (e.g., via schedule feature 918). In some examples, the process may forward the cell responsive to a cell transfer interval. The process may then return to block 1300.

Figure 14:
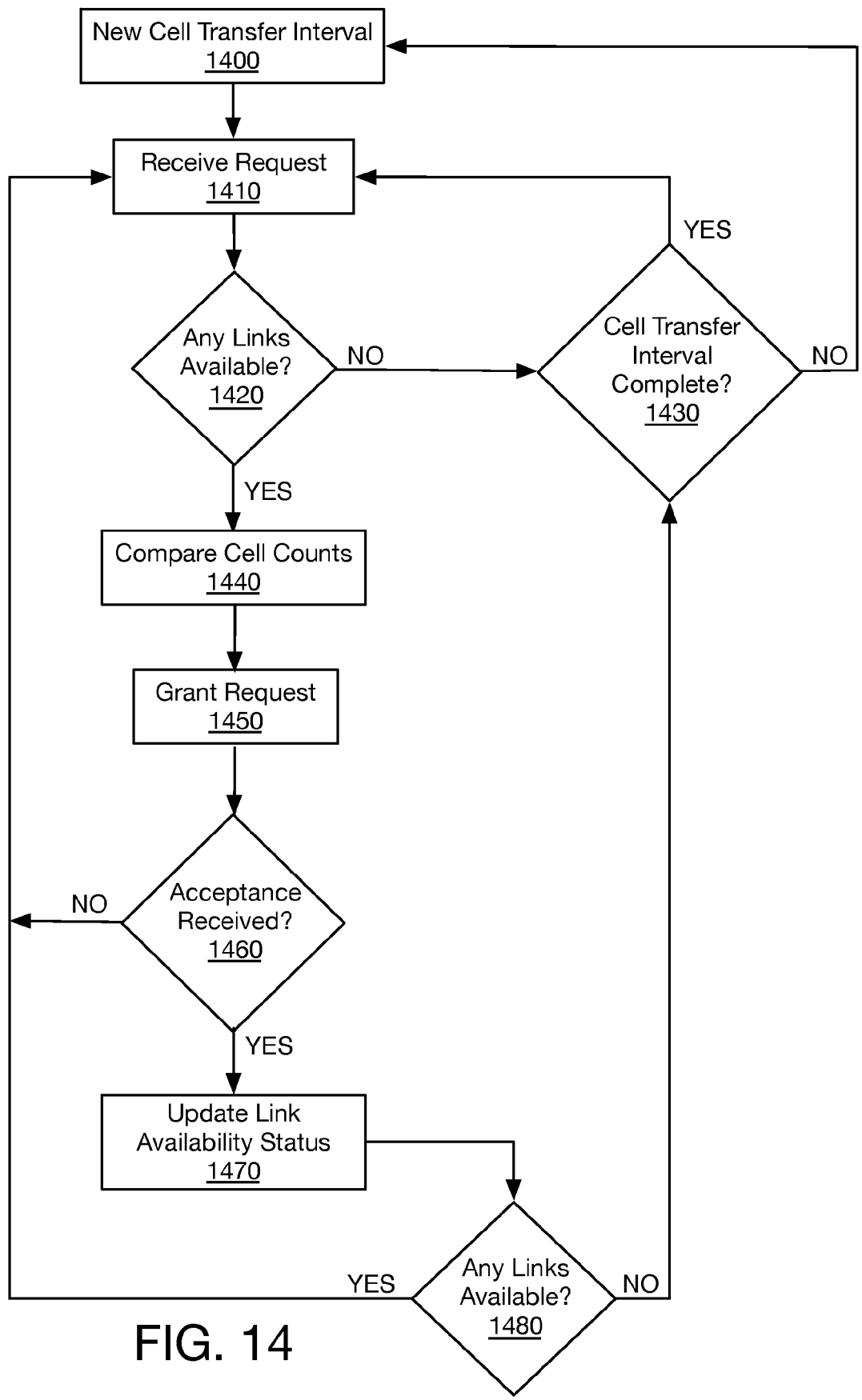
FIG. 14 illustrates a flow chart of example methods for granting a request to match a link between an input module and a central module.

FIG. 14 illustrates a flow chart of example methods for granting a request to match a link between an IM 120 and a CM 130, in accordance with the present disclosure. The same portions of switch 200 as shown in FIGS. 2, 3 and 7, along with the various managers described in FIGS. 9-11, may be used to illustrate the example methods. But the described methods are not limited to only implementations on switch 200 including the various managers described in FIGS. 9-11. The example methods may be implemented on other types of three-stage Clos-network packet switches that may include managers having one or more of the elements depicted in FIGS. 9-11.

Processing begins at block 1400 (New Cell Transfer Interval), where a new cell transfer interval has started. The new cell transfer interval indicates that previously matched links for switch 200 may now be available for matching. The new cell transfer interval may include a first cell transfer interval (e.g., at initiation or startup of switch 200) and subsequent cell transfer intervals after the first cell transfer interval has ended. In some examples, when a new cell transfer interval has started, a timer may be set. IM manager 124, for example, may include logic and/or features (e.g., timer feature 1016) configured to set the timer for a period of time that expires at the end or completion of a cell transfer interval.

Processing continues from block 1400 to block 1410 (Receive Request), where a request may be received (e.g., via IM manager 124) to match a link between an IM 120 and a CM 130 for VOQs maintained at IP 110s coupled to an IM 120. The request may indicate a total cell count for cells stored in VOQs associated with a VOM. In some examples, the request may be made to an IM manager 124 for IM(0) and is for VOM(0,1,1) at IP(0,1). The request, for example, may be received by arbiter feature 1012 of IM manager 124 for IM(0). As illustrated in FIG. 2, and mentioned above, IM(0) may have links $L_f(0,0)$, $L_f(0,1)$ and $L_f(0,2)$ coupled to CM(0), CM(1) and CM(2), respectively.

Proceeding to decision block 1420 (Any Links Available?), the process may determine whether a link is available for matching. In some examples, arbiter feature 1012 of IM manager 124 may access a link status table and/or registers maintained in a memory (e.g., memory 1030) to determine link availability. Processing may continue from decision block 1420 to block 1440 when a link is available. Otherwise, processing may continue from decision block 1420 to decision block 1430 when no link is available.

In decision block 1430 (Cell Transfer Interval Complete?), the process may determine (e.g., via IM manager 124) whether a cell transfer interval has completed. In some examples, completion of a cell transfer interval may be determined (e.g., by timer feature 1016) based on an expiration of the timer that was set as described above for block 1400. Processing may move from decision block 1430 to block 1410 when the cell transfer interval has completed. Otherwise, processing may move from decision block 1430 to block 1400.

Proceeding to block 1440 (Compare Cell Count), the process may compare the cell count received in the request (e.g., from IP manager 114 for IP(0,1)) to a cell count in one or more other requests (e.g., from IP manager 114 for IP(0,0)). In some examples, arbiter feature 1012 of IM manager 124 may compare the cell counts.

Continuing to block 1450 (Grant Request), the process may grant the request (e.g., via arbiter feature 1012) based on the request indicating the largest cell count when compared to the cell count(s) for the one or more other requests. In some examples, the cell count for VOM(0,1,1) may be the largest cell count. Because of the largest total cell count for VOM(0,1,1), a grant may be provided to match an available link $L_f$125 of IM(0). An available link may be link $L_f(0,2)$. Since VOM (0,1,1) may be associated with VOQs maintained at IP(0,1), the IP manager 114 for IP(0,1) may receive the grant to match link $L_f(0,2)$ for forwarding a cell stored in these VOQs.

Proceeding to decision block 1460 (Acceptance Received?), the process may determine (e.g., via arbiter feature 1014) whether an acceptance has been received for the grant. In some examples, as mentioned above for block 1450, the grant may be provided to the IP manager 114 for IP(0,1). Processing may moves from decision block 1460 to block 1410 when an acceptance has not been received (e.g., from IP manager 114 for IP(0,1)). Otherwise, the processing may continue from decision block 1460 to block 1470.

In block 1470 (Update Link Availability Status), the process may receive an acceptance. In some examples, update feature 1014 of IM manager 124 may update the link status table (e.g., maintained in memory 1030) to indicate that link $L_f(0,2)$ is matched to VOM(0,1,1).

Proceeding to decision block 1480 (Any Links Available?), the process may again determine whether a link is available for matching (e.g., via arbiter feature 1012). Processing may move from decision block 1420 to block 1410 when a link is available and the process receives another request. Otherwise, processing may move from decision block 1420 to decision block 1430 when no link is available.

Figure 15:
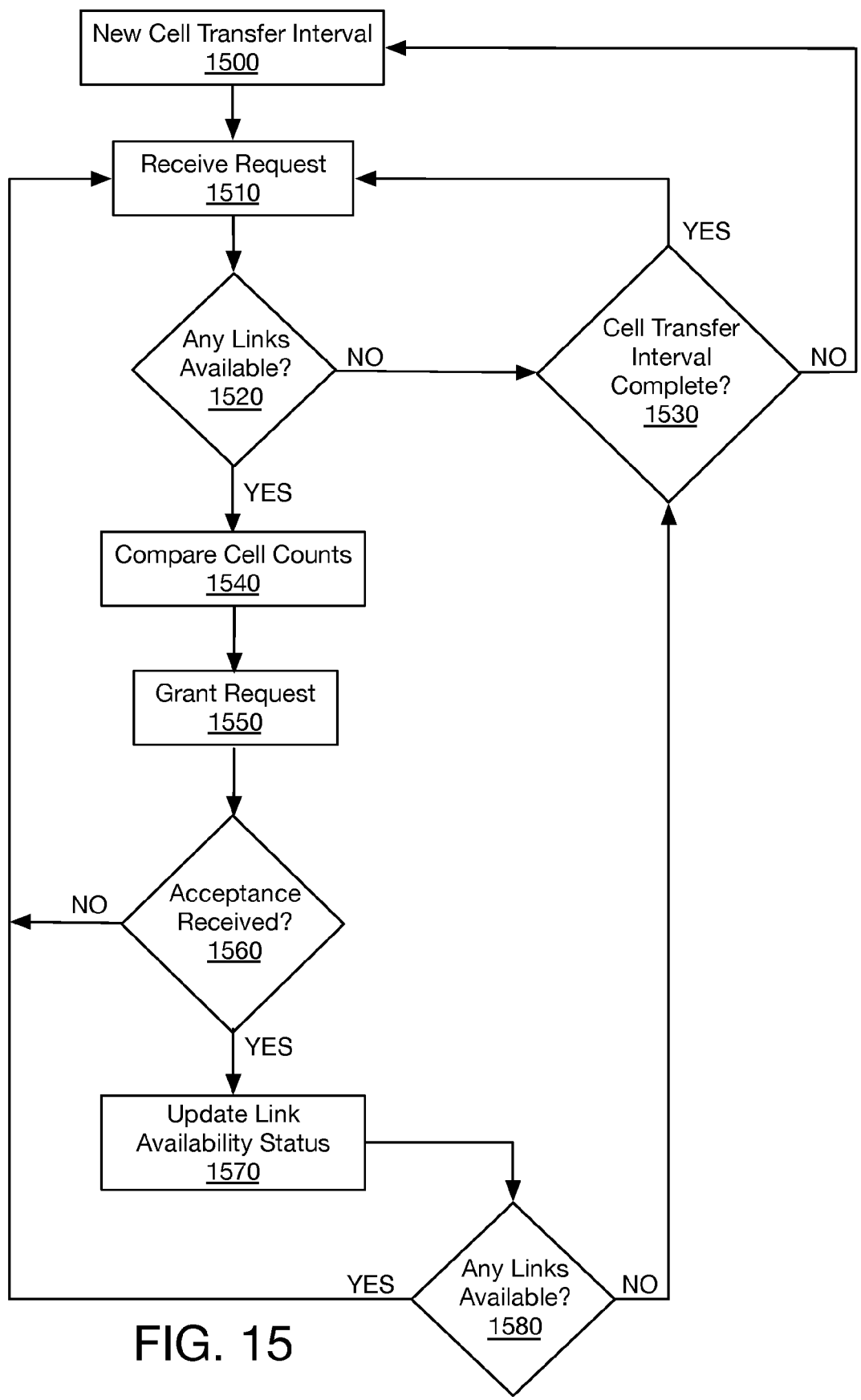
FIG. 15 illustrates a flow chart of example methods for granting a request to match a link between a central module and an output module.

FIG. 15 illustrates a flow chart of example methods for granting a request to match a link between a CM 130 and an OM 140, in accordance with the present disclosure. The same portions of switch 200 as shown in FIGS. 2, 3 and 7, along with the various managers described in FIGS. 9-11, may be used to illustrate the example methods. But the described methods are not limited to only implementations on switch 200 including the various managers described in FIGS. 9-11. The example methods may be implemented on other types of three-stage Clos-network packet switches that may include managers having one or more of the elements depicted in FIGS. 9-11.

Processing beings at block 1500 (New Cell Transfer Interval), where a new cell transfer interval has begun. The new cell transfer interval may indicate that previously matched links for switch 200 may now be available for matching. The new cell transfer interval may include a first cell transfer interval (e.g., at initiation or startup of switch 200) and subsequent cell transfer intervals. The new cell transfer interval may include a first cell transfer interval (e.g., at initiation or startup of switch 200) and subsequent cell transfer intervals after the first cell transfer interval has ended. In some examples, when a new cell transfer interval has started, a timer may be set. CM manager 134, for example, may include logic and/or features (e.g., timer feature 1116) configured to set the timer for a period of time that expires at the end or completion of a cell transfer interval.

Processing continues from block 1500 to block 1510 (Receive a Request), where a request may be received (e.g., via CM manager 134) to match a link between a CM 130 and an OM 140 for VOQs maintained at IP 110s. The request may indicate a cell count for cells stored in VOQs associated with a VOM identifier. In some examples, the request may be made to a CM manager 134 for CM(2) and is for VOM(0,1,1) at IP(0,1). The request, for example, may be received by arbiter feature 1112 of CM manager 134 for CM(2). As shown in FIG. 2, and mentioned above, CM(2) may have links $L_C(2,0)$, $L_C(2,1)$ and $L_C(2,2)$ coupled to OM(0), OM(1) and OM(2), respectively.

Proceeding to decision block 1520 (Any Links Available?), the process may determine (e.g., via CM manager 134) whether a link is available for matching. In some examples, arbiter feature 1112 may access a link status table and/or a register maintained in a memory (e.g., memory 1130) to determine link availability. As mentioned previously, VOM (0,1,1) of switch 200 may be associated with VOQs having cells destined for OP(1,0) and OP(1,1). So in some examples, as illustrated in FIG. 2 for switch 200, OP(1,0) and OP(1,1) may be coupled to OM(1). Because link $L_C(2,1)$ is depicted in FIG. 2 as the only link between CM(2) and OM(1), only the availability of link $L_C(2,1)$ needs to be checked. Processing may continue from decision block 1520 to block 1540 when link $L_C(2,1)$ is available. Otherwise, processing may continue from decision block 1520 to decision block 1530 when link $L_C(2,1)$ is not available.

In decision block 1530 (Cell Transfer Interval Complete?), the process may determine (e.g., via CM manager 134) whether a cell transfer interval has completed. In some examples, completion of a cell transfer interval may be determined (e.g., by timer feature 1116) based on an expiration of the timer that was set as described above for block 1500. Processing may move from decision block 1530 to block 1510 when the cell transfer interval has completed. Otherwise, processing may move from decision block 1530 to block 1500.

Proceeding to block 1540 (Compare Cell Count), the process may compare the cell count indicated in the request (e.g., from IP manager 114 for IP(0,1)) to cell counts indicated in one or more other received requests (e.g., from IP manager 114s for other IP 110s). In some examples, arbiter feature 1112 of CM manager 134 may compare the cell counts.

Continuing to block 1550 (Grant Request), the process may grant the request (e.g., via arbiter feature 1112) based on the request indicating the largest cell count when compared to cell count(s) for the one or more other requests. In some examples, the cell count for VOM(0,1,1) may have the largest cell count. Because VOM(0,1,1) has the largest cell count, in this example, a grant may be provided to match link $L_C(2,1)$ of CM(2). Since VOM(0,1,1) is associated with VOQs maintained at IP(0,1), the IP manager 114 for IP(0,1) may receive the grant to match link $L_f(0,2)$ for forwarding a cell stored in these VOQs and the IP manager 114 for IP(0,1) may accept the grant to match link $L_f(0,2)$. In some other examples, the IM manager 124 for the IM(0) coupled to IP(0,1) may receive the grant and may accept the grant to match link $L_f(0,2)$ on behalf of IP manager 114 for IP(0,1).

Proceeding to decision block 1560 (Acceptance Received?), the process may determine (e.g., via arbiter feature 1114) whether an acceptance has been received for the grant. In some examples, as mentioned above for block 1550, the grant may be provided to the IP manager 114 for IP(0,1). While in other examples, the grant may be provided to the IM manager 124 for IM(0). Processing may move from decision block 1560 to block 1510 when an acceptance has not been received (e.g., from IP manager 114 for IP(0,1) or from IM manager 124 for IM(0)). Otherwise, the processing may continue from decision block 1560 to block 1570.

In block 1570 (Update Link Availability Status), since the process has received an acceptance, update feature 1114 of CM manager 134 may update the link status table and/or a register allocated to link $L_C(2,1)$ (e.g., maintained in memory 1130) to indicate that link $L_C(2,1)$ is matched to VOM(0,1,1).

Proceeding to decision block 1580 (Any Links Available?), the process may again determine whether a link is available for matching (e.g., via arbiter feature 1112). Processing may move from decision block 1580 to block 1510 when a link is available. Otherwise, processing may move from decision block 1580 to decision block 1530 when no link is available.

Figure 16:
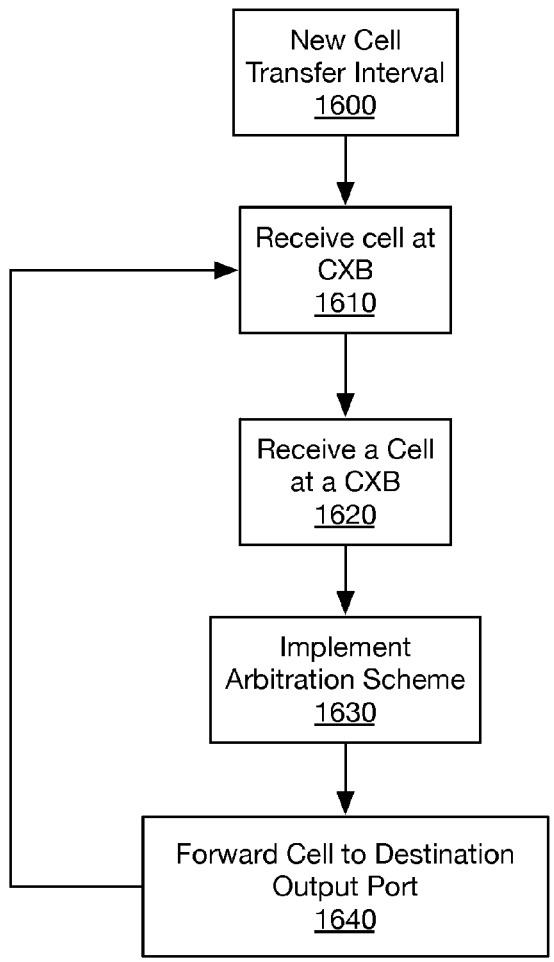
FIG. 16 illustrates a flow chart of example methods for forwarding a cell stored at a queue maintained at an output module.

FIG. 16 illustrates a flow chart of example methods for forwarding a cell stored at a CXB maintained at an OM 140, in accordance with the present disclosure. The portion of switch 200 as shown in FIG. 8, along with the OM manager 144 described in FIG. 12, may be used to illustrate the example methods. But the described example methods are not limited to only implementations on the portion of switch 200 shown in FIG. 8 or the OM manager 144 as described for FIG. 12. The example methods may be implemented on other types of three-stage Clos-network packet switches that may include an OM manager 144 having one or more of the elements depicted in FIG. 8 and FIG. 12.

Processing begins at block 1600 (New Cell Transfer Interval), where a new cell transfer interval has begun. In some examples, the new cell transfer may indicate that a CXB maintained at an OM 140 may be ready and/or configured to receive a cell via a configured route (e.g., route 720). The new cell transfer interval may include a first cell transfer interval (e.g., at initiation or startup of switch 200) and subsequent cell transfer intervals after the first cell transfer interval has ended.

Processing continues from block 1600 to block 1610 (Receive a Cell at a CXB), where the process may receive (e.g., via receive feature 1212 for OM manager 144) a cell at CXB 142 maintained at OM 140. In some examples, as shown in FIGS. 7 and 8, the cell may be received via a configured route 720 and at least temporarily stored at CXB 142 maintained at OM(1) of switch 200. As mentioned previously, CXB 142 may be configured to include CXBs having identifiers associated with destination output ports and configured to receive a cell via a configured route. Also as mentioned previously, route 720 may be configured to forward a cell to a CXB with an identifier of CXB(0,1,1,0). So, for example, a cell may be received in CXB(0,1,1,0) maintained at OM(1) and associated with OP(1,0).

Continuing to block 1620 (Implement Arbitration Scheme), the process may implement an arbitration scheme (e.g., via arbitration feature 1214) to select a CXB having a cell that may be forwarded at the next cell transfer interval. In some examples, the arbitration scheme may be implemented based on selecting a given CXB having the largest cell count. In some other examples, the arbitration scheme may be implemented based on selecting a given CXB via a round-robin selection of one or more CXBs storing a cell.

Continuing to block 1630 (Forward Cell to Destination Output Port), where the process may select a CXB (e.g., via arbitration feature 1214) and forwards the cell (e.g., via forward feature 1214) to its destination OP 150. In some examples, the selected CXB may have an identifier of CXB (0,1,1,0) having a cell destination for OP(1,0). As a result of CXB(0,1,1,0) being selected, the cell with a destination of OP(1,0) may be forwarded (e.g., by forward feature 1214) to OP(1,0). The process may then return to block 1610.

FIG. 17 illustrates a block diagram of an example computer program product 1700. In one embodiment, as shown in FIG. 17, computer program product 1700 may include a signal bearing medium 1702 that may also include instructions 1704. In some examples, instructions 1704 for configuring one or more routes through a three-stage Clos-network packet switch (e.g., switch 100), which, when executed by logic associated with an input port (e.g., configure logic 910) may cause the logic to obtain a cell count for data partitioned into one or more cells and stored at one or more VOQs maintained at an input port coupled to an input module for the three-stage Clos-network packet switch. The VOQs may be associated with one or more output modules for the three-stage Clos-network packet switch. The cells stored at the VOQs may have a destination output port coupled to an output module from among the output modules. Instructions 1704 may further cause the logic to determine which of the VOQs associated with a given output port module from among the output modules has the largest total cell count. A request to match a first link between the input module and a given central module may then be placed with the request indicating the total cell count for the VOQs associated with the given output port module that were determined to have the largest total cell count.

Instructions 1704 may also cause the logic to receive and accept a grant for the request to match the first link. The grant received, for example, may be based on the indicated total cell count being greater than a total cell count indicated in one or more other requests. Further, instructions 1704 may cause the logic to receive an indication that a request to match a second link between the given central module and the given output module has been granted and accepted to match the second link. Instructions 1704 may then cause the logic to configure a route from a VOQ. The configured route, for example, may include the first matched link and the second matched link. The VOQ may be selected from among the VOQs associated with the given output module. The selection may be based on the VOQ having the largest cell count. Further, in response to a cell transfer interval, instructions 1704 may cause the logic to forward a cell stored at the VOQ via the configured route to a queue maintained at the given output module. The queue, for example, may be associated with the destination output port for the cell.

Also depicted in FIG. 17, some examples may include one or more of a computer readable medium 1706, a recordable medium 1708 and a communications medium 1710. The dotted boxes around these elements depict different types of mediums included within, but not limited to, signal bearing medium 1702. These types of mediums may distribute instruction 1704 to be executed by logic associated with an input port. Computer readable medium 1706 and recordable medium 1708 may include, but are not limited to, a flexible disk, a hard disk drive (HDD), a Compact Disc (CD), a Digital Video Disk (DVD), a digital tape, a computer memory, etc. Communications medium 810 may include, but is not limited to, a digital and/or an analog communication medium (e.g., a fiber optic cable, a waveguide, a wired communication link, a wireless communication link, etc.).

Figure 18:
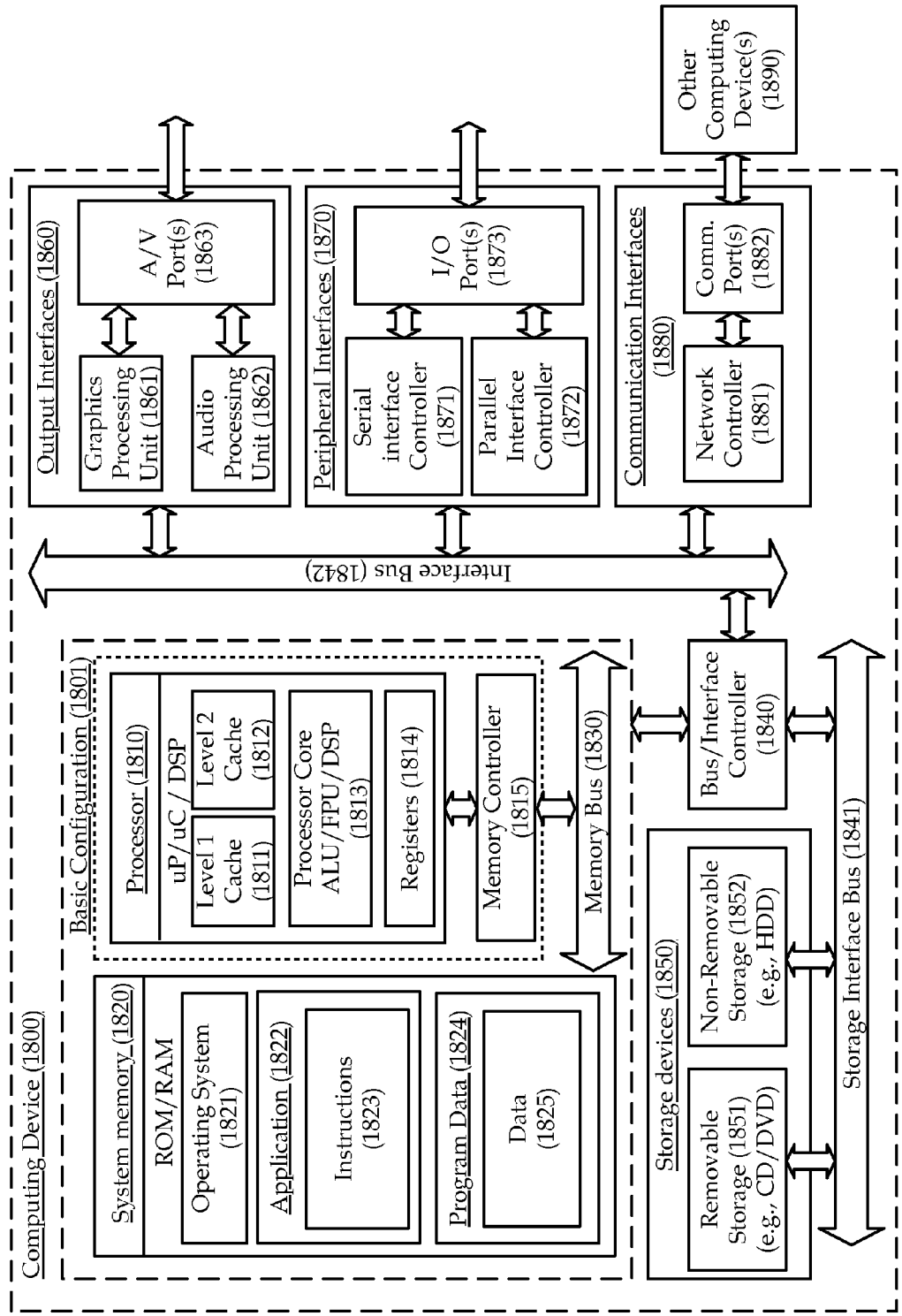
FIG. 18 illustrates an example computing device that is arranged for configuring one or more routes through a three-stage Clos-network packet switch, all arranged in accordance with the present disclosure.
Figure 4:
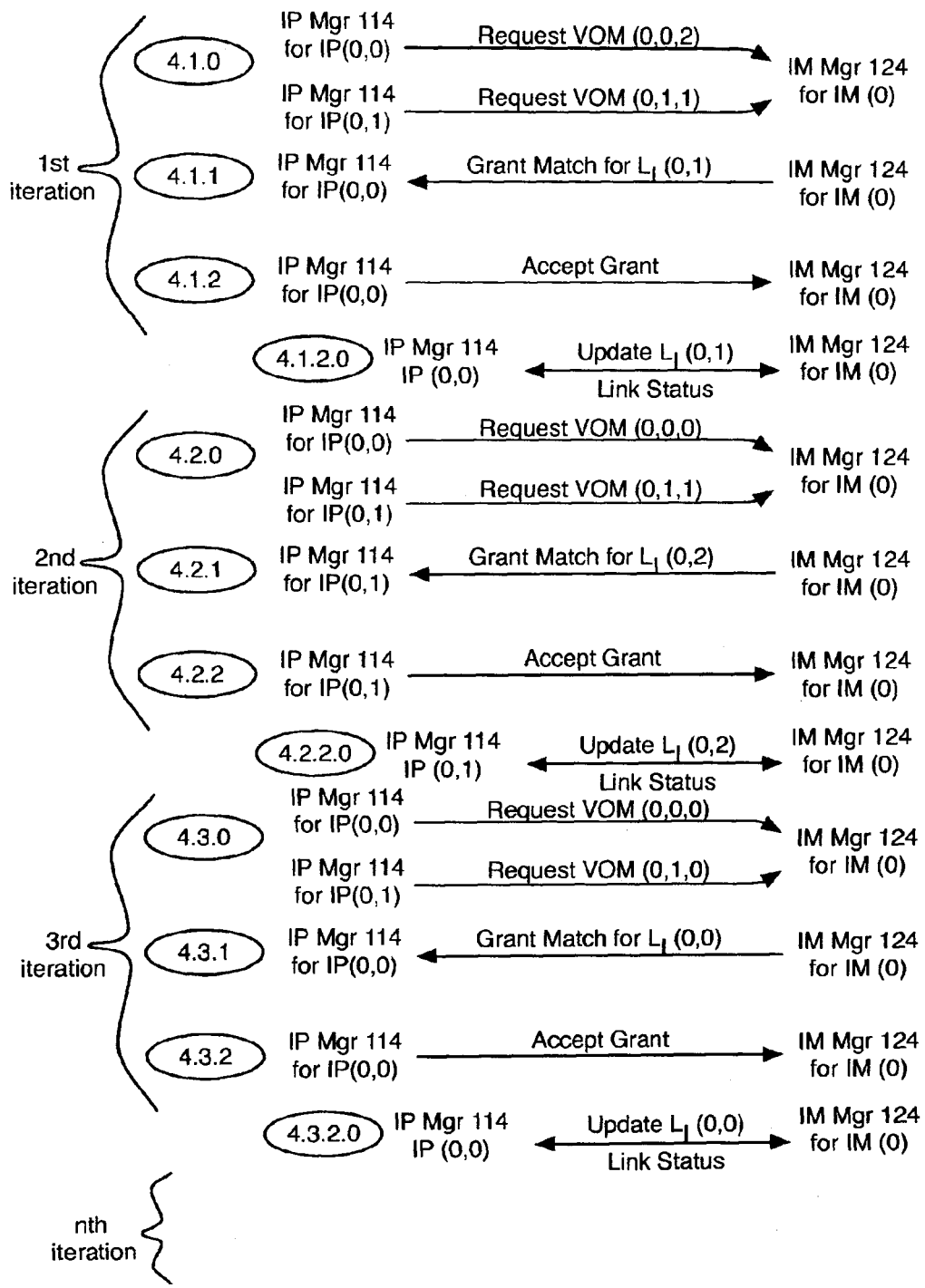
Figure 9:
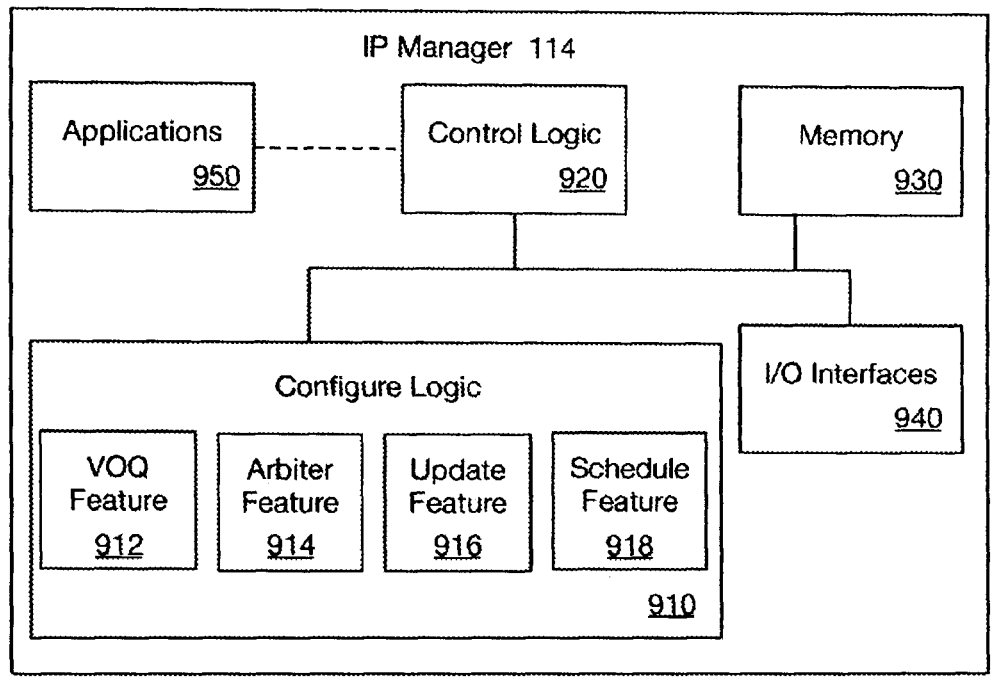
Figure 10:
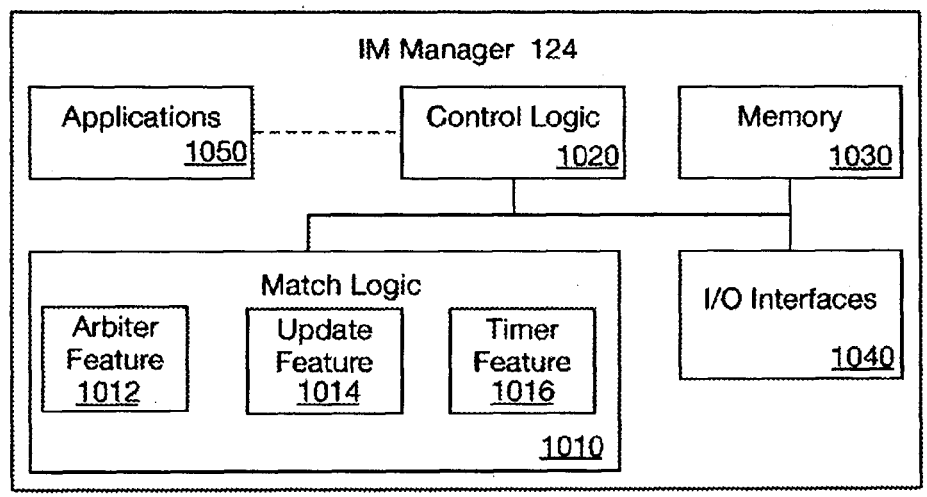
Figure 18:
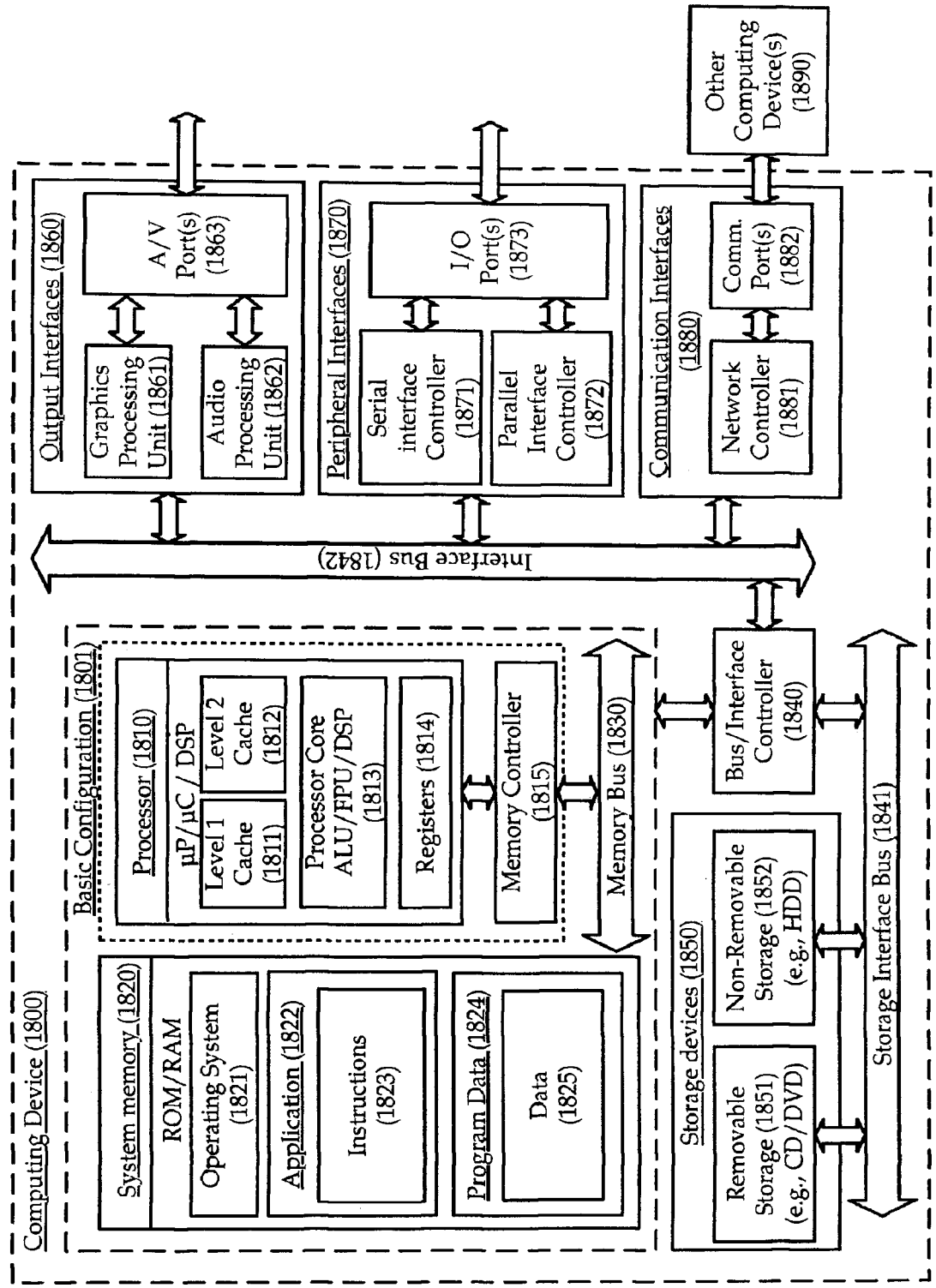

FIG. 18 is a block diagram illustrating an example computing device 1800 that is arranged for configuring one or more routes through a three-stage Clos-network packet switch in accordance with the present disclosure. In a very basic configuration 1801, computing device 1800 typically includes one or more processors 1810 and system memory 1820. A memory bus 1830 may be used for communicating between the processor 1810 and the system memory 1820.

Depending on the desired configuration, processor 1810 may be of any type including but not limited to a microprocessor (µP), a microcontroller (µC), a digital signal processor (DSP), or any combination thereof. Processor 1810 may include one more levels of caching, such as a level one cache 1811 and a level two cache 1812, a processor core 1813, and registers 1814. The processor core 1813 may include an arithmetic logic unit (ALU), a floating point unit (FPU), a digital signal processing core (DSP Core), or any combination thereof. A memory controller 1815 may also be used with the processor 1810, or in some implementations the memory controller 1815 may be an internal part of the processor 1810.

Depending on the desired configuration, the system memory 1820 may be of any type including but not limited to volatile memory (such as RAM), non-volatile memory (such as ROM, flash memory, etc.) or any combination thereof. System memory 1820 typically includes an operating system 1821, one or more applications 1822, and program data 1824. Application 1822 includes configuration instructions 1823 that are arranged to perform the functions as described herein including the actions described with respect to the process diagrams shown in FIGS. 4-6 or to the functions described for the manager architectures shown in FIGS. 9-12 or including the actions described with respect to the flow charts shown in FIGS. 13-16. Program Data 1824 includes configuration data 1825 that is useful for implementing instructions 1823 (e.g., VOQ cell counts, link status updates, implementing arbitration schemes, etc.). In some examples, application 1822 may be arranged to operate with program data 1824 on an operating system 1821 such that implementations of configuring one or more routes through a three-stage Clos-network packet switch may be provided as described herein. This described basic configuration is illustrated in FIG. 18 by those components within dashed line 1801.

Computing device 1800 may have additional features or functionality, and additional interfaces to facilitate communications between the basic configuration 1801 and any required devices and interfaces. For example, a bus/interface controller 1840 may be used to facilitate communications between the basic configuration 1801 and one or more data storage devices 1850 via a storage interface bus 1841. The data storage devices 1850 may be removable storage devices 1851, non-removable storage devices 1852, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 1820, removable storage 1851 and non-removable storage 1852 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 1800. Any such computer storage media may be part of device 1800.

Computing device 1800 may also include an interface bus 1842 for facilitating communication from various interface devices (e.g., output interfaces, peripheral interfaces, and communication interfaces) to the basic configuration 1801 via the bus/interface controller 1840. Example output interfaces 1860 include a graphics processing unit 1861 and an audio processing unit 1862, which may be configured to communicate to various external devices such as a display or speakers via one or more A/V ports 1863. Example peripheral interfaces 1860 include a serial interface controller 1871 or a parallel interface controller 1872, which may be configured to communicate with external devices such as input devices (e.g., keyboard, mouse, pen, voice input device, touch input device, etc.) or other peripheral devices (e.g., printer, scanner, etc.) via one or more I/O ports 1873. An example communication interface 1880 includes a network controller 1881, which may be arranged to facilitate communications with one or more other computing devices 1890 over a network communication via one or more communication ports 982.

In some examples, computing devices 1890 may include all or at least a portion of one or more interconnected modules and/or ports include in a three-stage Clos-network packet switch as shown in FIG. 1 (e.g., IP 110, IM 120, CM 130, OM 140, OP 150). A network communication connection is one example of a communication media. Communication media may typically be embodied by computer readable instructions, data structures, program modules, or other data in a modulated data signal, such as a carrier wave or other transport mechanism, and includes any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

References made in this disclosure to the term "responsive to" or "in response to" are not limited to responsiveness to only a particular feature and/or structure. A feature may also be responsive to another feature and/or structure and also be located within that feature and/or structure. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

Those skilled in the art will recognize that it is common within the art to describe devices and/or processes in the fashion set forth herein, and thereafter use engineering practices to integrate such described devices (e.g., nodes, RF controller, computing device, etc.) and/or methods into data processing systems. That is, at least a portion of the devices and/or methods described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available component, such as those typically found in data computing/communication and/or network computing/communication systems.

The herein described subject matter sometimes illustrates different components or elements contained within, or connected with, different other components or elements. It is to be understood that such depicted architectures are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. An apparatus to configure one or more routes through a three-stage Clos-network packet switch to forward data received at an input port for the three-stage Clos-network packet switch, the received data partitioned into one or more cells and stored at one or more virtual output queues maintained at the input port coupled to an input module for the three-stage Clos-network packet switch, the one or more cells stored at the one or more virtual output queues separately destined for an output port coupled to an output module from among one or more output modules for the three-stage Clos-network packet switch, the apparatus comprising:

an input manager at the input port, the input manager including logic configured to:
    obtain a cell count associated with the one or more cells stored at the one or more virtual output queues maintained at the input port coupled to an input module, the one or more virtual output queues separately associated with one or more output modules;
    determine which of the one or more virtual output queues separately associated with a given output module from among the one or more output modules has the largest total cell count;
    place a request to match a first link between the input module and a central module, the request to indicate the total cell count for the one or more virtual output queues separately associated with the given output module that were determined to have the largest total cell count;
    receive a grant for the request based on the indicated total cell count being greater than a total cell count indicated in one or more other requests;
    accept the grant to match the first link;
    receive an indication that a separate request to match a second link between the central module and the given output module has been granted and the grant accepted to match the second link; and
    configure a route from a virtual output queue, the configured route to include the first matched link and the second matched link, the virtual output queue selected from among the one or more virtual output queues separately associated with the given output module, selection based on the virtual output queue having the largest cell count, wherein in response to a cell transfer interval, a cell stored at the virtual output queue is forwarded via the configured route to a queue maintained at the given output module, the queue associated with the destination output port for the cell.

2. An apparatus according to claim 1, wherein to accept the grant to match the first link further comprises logic configured to update a link status for the first link, the updated link status to indicate the first link is matched.

3. An apparatus according to claim 1, wherein the cell transfer interval comprises a period of time allocated to forward a given cell of partitioned data stored at the selected virtual output queue from the input port for the three-stage Clos-network packet switch to the given output module for the three-stage Clos-network packet switch.

4. A method for configuring one or more routes through a three-stage Clos-network packet switch for forwarding data received at an input port for the three-stage Clos-network packet switch, the received data partitioned into one or more cells and stored at one or more virtual output queues maintained at the input port coupled to an input module for the three-stage Clos-network packet switch, the one or more cells stored at the one or more virtual output queues separately destined for an output port coupled to an output module from among one or more output modules for the three-stage Clos-network packet switch, the method comprising:

obtaining a cell count associated with the one or more cells stored at the one or more virtual output queues maintained at the input port, the one or more virtual output queues separately associated with one or more output modules;
    determining which of the one or more virtual output queues separately associated with a given output module from among the one or more output modules has the largest total cell count;
    placing a request to match a first link between the input module and a central module, the request to indicate the total cell count for the one or more virtual output queues separately associated with the given output module that were determined to have the largest total cell count;
    receiving a grant for the request based on the indicated total cell count being greater than a total cell count indicated in one or more other requests;
    accepting the grant to match the first link;
    receiving an indication that a separate request to match a second link between the central module and the given output module has been granted and the grant accepted to match the second link; and
    configuring a route from a virtual output queue, the configured route to include the first matched link and the second matched link, the virtual output queue selected from among the one or more virtual output queues separately associated with the given output module, selection based on the virtual output queue having the largest cell count, wherein in response to a cell transfer interval, a cell stored at the virtual output queue is forwarded via the configured route to a queue maintained at the given output module, the queue associated with the destination output port for the cell.

5. A method according to claim 4, wherein obtaining a cell count associated with data partitioned into one or more cells and stored at one or more virtual output queues maintained at the input port comprises obtaining a total cell count for a first group of virtual output queues separately associated with a first output module from among the one or more output modules and obtaining a total cell count for a second group of virtual output queues separately associated with a second output module from among the one or more output modules, the first group of virtual output queues including one or more cells separately destined for an output port coupled to the first output module, the second group of virtual output queues including one or more cells separately destined for an output port coupled to the second output module.

6. A method according to claim 5, wherein determining which of the one or more virtual output queues separately associated with a given output module from among the one or more output modules has the largest total cell count comprises determining based on comparing the obtained total cell count for the first group of virtual output queues separately associated with the first output module to the obtained cell count for the second group of virtual output queues separately associated with the second output module.

7. A method according to claim 4, wherein accepting the grant to match the first link further comprises updating a link status for the first link between the input module and the central module, the updated link status to indicate the first link between the input module and the central module is matched.

8. A method according to claim 4, wherein the separate request to match the second link comprises the separate request originating from the input module.

9. A method according to claim 4, wherein the separate request to match the second link comprises the separate request originating from the input port.

10. A method according to claim 4, wherein the indication that the separate request to match the second link has been granted and the grant accepted to match the second link comprises the indication originating from the input module.

11. A method according to claim 4, wherein the indication that the separate request to match the second link has been granted and the grant accepted comprises the indication originating from the central module.

12. A method according to claim 4, wherein the cell transfer interval comprises a period of time allocated to forward a given cell of partitioned data stored at the selected virtual output queue from the input port for the three-stage Clos-network packet switch to the output module for the three-stage Clos-network packet switch.

13. A method for granting a request to match a link between an input module and a central module for a three-stage Clos-network packet switch, the request associated with one or more virtual output queues maintained at an input port coupled to the input module, the one or more virtual output queues to store data received at the input port and partitioned into one or more cells, the one or more cells separately destined for an output port coupled to a given output module for the three-stage Clos-network packet switch, the method comprising:

receiving the request to match the link between the input module and the central module, the request to indicate a cell count for the one or more cells stored in the one or more virtual output port queues and separately destined for the output port coupled to the given output module;

granting the request based on the indicated cell count being greater than a cell count indicated in one or more other requests and based on an availability of an unmatched link between the input module and the central module; and sending an indication of the grant to the requester, wherein the indication includes a link identifier to indicate the matched link as a link coupled between the input module and the central module.

14. A method according to claim 13, further comprising:
receiving an acceptance of the grant to the matched link; and
updating a link status for the matched link, the updated status to indicate that the link between the input module and the central module is matched.

15. A method according to claim 14, wherein updating the link status comprises maintaining a link status in a memory, the memory including a register configured to indicate the link status for the link between the input module and the central module is matched.

16. A method according to claim 14, wherein responsive to receiving a subsequent request to match a link between the input module and the central module, the updated link status to indicate that the link between the input module and the central module is matched further indicates that the link between the input module and the central module is unavailable.

17. A method according to claim 16, wherein responsive to a cell transfer interval, the link status for the link between the input module and the central module is updated again, the new updated status to indicate that the link between the input module and the central module is an unmatched link.

18. A method according to claim 17, wherein the cell transfer interval comprises the cell transfer interval to include a period of time allocated to forward a given cell of partitioned data from the input port for the three-stage Clos-network packet switch to the given output module for the three-stage Clos-network packet switch.

19. A method accord to claim 13, further comprising:
receiving an acceptance of the grant to the matched link;
placing a separate request to match a link between the central module and the given output module, the separate request to indicate the cell count for one or more cells separately destined for an output port coupled to the given output module;
receiving a grant for the separate request based on the indicated cell count being greater than a cell count indicated in one or more other requests to match the link between the central module and the given output module;
accepting the grant for the separate request to match the link between the central module and the given output module;
updating a link status for the link between the central module and the given output module, the updated status to indicate that the link between the central module and the given output module is matched; and
forwarding an indication of acceptance of the grant for the separate request, the indication to include a link identifier associated with the link between the central module and the given output module, wherein the indication of acceptance of the grant is forwarded to a source for the request associated with the one or more virtual output queues maintained at the input port coupled to the input module.

20. A method accord to claim 13, further comprising:
receiving an acceptance of the grant to the matched link;
forwarding a separate request to match a link between the central module and the given output module, the separate request to indicate the cell count for one or more cells separately destined for an output port coupled to the given output module, the separate request for the one or more virtual output queues maintained at the input port coupled to the input module;
receiving a grant for the separate request based on the indicated cell count being greater than a cell count indicated in one or more other requests to match the link between the central module and the given output module; and
forwarding to the source of the separate request an indication that the separate request to match the link between the central module and the given output module has been granted;
forwarding an indication of acceptance of the grant for the separate request, the indication of acceptance of the grant for the separate request forwarded to the central module.

21. A method for granting a request to match a link between a central module and an output module for a three-stage Clos-network packet switch, the request associated with one or more virtual output queues maintained at an input port coupled to an input module for the three-stage Clos-network packet switch, the one or more virtual output queues to store data received at the input port and partitioned into one or more cells, the one or more cells separately destined for an output port coupled to a given output module for the three-stage Clos-network packet switch, the method comprising:
receiving the request to match the link between the central module and the output module, the request to indicate a cell count for the one or more cells stored in the one or more virtual output port queues and separately destined for an output port coupled to the output module;
granting the request based on the indicated cell count being greater than a cell count indicated in one or more other requests and based on an availability of the link between the central module and the output module; and
sending an indication of the grant to the requester, wherein the indication includes a link identifier to indicate the matched link as a link coupled between the central module and the output module.

22. A method according to claim 21, further comprising:
receiving an acceptance of the grant to the matched link; and
updating a link status for the matched link, the updated link status to indicate that the link between the central module and the output module is matched.

23. A method according to claim 22, wherein updating the link status comprises maintaining a link status in a memory, the memory including a register configured to indicate the link status for the link between the central module and the output module is matched.

24. A method according to claim 22, wherein responsive to receiving a subsequent request to match a link between the central module and the output module, the updated link status to indicate that the link between the central module and the output module is matched further indicates that the link between the central module and the output module is unavailable.

25. A method according to claim 24, wherein responsive to a cell transfer interval, the link status for the link between the central module and the output module is updated again, the new updated link status to indicate that the link between the central module and the output module is unmatched.

26. A method according to claim 25, wherein the cell transfer interval comprises the cell transfer interval to include a period of time allocated to forward a given cell of partitioned data stored at the selected virtual output queue from the input port for the three-stage Clos-network packet switch to the output module for the three-stage Clos-network packet switch.

27. A three-stage Clos-network switch comprising:
an input port to configured to maintain a first virtual output queue and a second virtual output queue, the first virtual output queue to store data partitioned into a one or more cells destined for a first output port, the second virtual output queue to store data partitioned into one or more cells destined for a second output port, the input port having an input port manager, wherein the input port manager and the first and the second virtual output queues are arranged in cooperation with one another to enable the input port manager to obtain a separate cell count for the first and the second virtual output queues to determine a total cell count;
an input module coupled to the input port, the input module having an input module manager configured to match a first link;
a central module coupled to the input module via the first link, the central module having a central module manager configured to match a second link; and
an output module coupled to the central module via the second link, the output module configured to maintain a first queue associated with the first virtual output queue and a second queue associated with the second virtual output queue, the output module having an output module manager, wherein the output module manager and the first and the second queue are arranged in cooperation with one another to receive a cell forwarded from the first virtual output queue via the second link and to receive a cell forwarded from the second virtual output queue via the second link;
wherein the input port manager is further configured to:
place a first request to the input module manager for the input module, the first request to match the first link, the request to indicate the total cell count for the first virtual output queue and the second virtual output queue;
receive a grant for the first request based on the indicated total cell count being greater than another indicated total cell count for a separate request received by the input module manager for the input module;
accept the grant to match the first link;
receive an indication that a second request to match the second link has been granted and accepted to match the second link, the second request granted by the central module manager for the central module, the second request granted based on the indicated total cell count for the second request being equal to the cell count in the first request and being greater than another indicated total cell count for a request received by the central module manager for the central module; and
configure a route to forward a cell from the first virtual output queue based on the cell count for the first virtual output queue being larger than the cell count for the second virtual output queue, the configured route to include the matched first link and the matched second link, wherein in response to a cell transfer interval, a cell stored at the first virtual output queue is forwarded via the configured route to the first queue maintained at the output module.

28. A system according to claim 27, the logic for the output module manager further configured to:
   forward the cell received via the configured route and placed in the first queue to the first output port in response to another cell transfer interval, the cell received via the configured route to be forwarded based on implementing an arbitration scheme, the arbitration scheme to include a round-robin selection of the first queue from among one or more other queues maintained at the output module having cells destined for the first output port.

29. A system according to claim 27, wherein the cell transfer interval comprises a period of time allocated to forward a given cell of partitioned data stored at the selected virtual output queue from the input port for the three-stage Clos-network packet switch to the given output module for the three-stage Clos-network packet switch.

30. A computer program product comprising a non-transitory medium having stored therein instructions for configuring one or more routes through a three-stage Clos-network packet switch for forwarding data received at an input port for the three-stage Clos-network packet switch, the received data partitioned into one or more cells and stored at one or more virtual output queues maintained at the input port coupled to an input module for the three-stage Clos-network packet switch, the one or more cells stored at the one or more virtual output queues separately destined for an output port coupled to an output module from among the one or more output modules for the three-stage Clos-network packet switch, which, when executed by logic associated with an input port for the three-stage Clos-network packet switch, cause the logic to:
   obtain a cell count associated with the one or more cells and stored at the one or more virtual output queues maintained at the input port coupled to an input module, the one or more virtual output queues separately associated with one or more output modules;
   determine which of the one or more virtual output queues separately associated with a output module from among the one or more output modules has the largest total cell count;
   place a request to match a first link between the input module and a central module, the request to indicate the total cell count for the one or more virtual output queues separately associated with the output module that were determined to have the largest total cell count;
   receive a grant for the request based on the indicated total cell count being greater than a total cell count indicated in one or more other requests;
   accept the grant to match the first link;
   receive an indication that a separate request to match a second link between the given central module and the given output module has been granted and the grant accepted to match the second link; and
   configure a route from a virtual output queue, the configured route to include the first matched link and the second matched link, the virtual output queue selected from among the one or more virtual output queues separately associated with the output module, selection based on the virtual output queue having the largest cell count, wherein in response to a cell transfer interval, a cell stored at the virtual output queue is forwarded via the configured route to a queue maintained at the given output module, the queue associated with the destination output port for the cell.

31. A computer program product according to claim 30, wherein the cell transfer interval comprises a period of time allocated to forward a given cell of partitioned data stored at the selected virtual output queue from the input port for the three-stage Clos-network packet switch to the output module for the three-stage Clos-network packet switch.

* * * * *

UNITED STATES PATENT AND TRADEMARK OFFICE
CERTIFICATE OF CORRECTION

PATENT NO. : 8,300,650 B2
APPLICATION NO. : 12/485828
DATED : October 30, 2012
INVENTOR(S) : Rojas-Cessa et al.

It is certified that error appears in the above-identified patent and that said Letters Patent is hereby corrected as shown below:

On the Face Page, in Field (56), under "U.S. PATENT DOCUMENTS", in Column 1, Line 1, delete "Oki" and insert -- Oki et al. --, therefor.

In Fig. 4, Sheet 4 of 16, delete "fth iteration" and insert -- nth iteration --, therefor as shown on attached sheet.

In Fig. 10, Sheet 9 of 16, delete "  " and insert -- --, therefor as shown on attached sheet.

In Fig. 10, Sheet 9 of 16, delete "  " and insert -- --, therefor as shown on attached sheet.

In Fig. 18, Sheet 16 of 16, below Tag "Processor (1810)", in Line 1, delete "uP/uC" and insert -- μP/μC --, therefor as shown on attached sheet.

In Column 4, Line 54, delete "on" and insert -- or --, therefor.

In Column 28, Line 44, in Claim 19, delete "accord" and insert -- according --, therefor.

In Column 29, Line 4, in Claim 20, delete "accord" and insert -- according --, therefor.

Signed and Sealed this
Twelfth Day of February, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,300,650 B2
APPLICATION NO. : 12/485828
DATED : October 30, 2012
INVENTOR(S) : Rojas-Cessa et al.

Page 1 of 3

It is certified that error appears in the above-identified patent and that said Letters Patent is hereby corrected as shown below:

On the Title Page, in Item (56), under "OTHER PUBLICATIONS", in Column 2, Line 17, delete "Communications.," and insert -- Communications, --, therefor.

On the Title Page, in Item (57), under "ABSTRACT", in Column 2, Line 1, delete "Examples of are" and insert -- Examples are --, therefor.

Drawings

In Fig. 11, Sheet 10 of 16, for Tag "1140", in Line 1, delete "I/O Interface" and insert -- I/O Interfaces --, therefor.

In Fig. 13, Sheet 11 of 16, for Tag "1360", in Line 2, delete "between a CM" and insert -- between CM --, therefor.

In Fig. 14, Sheet 12 of 16, for Tag "1440", in Line 1, delete "Compare Cell Counts" and insert -- Compare Cell Count --, therefor.

In Fig. 15, Sheet 13 of 16, for Tag "1540", in Line 1, delete "Compare Cell Counts" and insert -- Compare Cell Count --, therefor.

In Fig. 16, Sheet 14 of 16, delete " 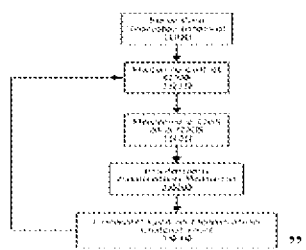 " and

Signed and Sealed this
Twenty-seventh Day of October, 2015

Michelle K. Lee
*Director of the United States Patent and Trademark Office* insert -- 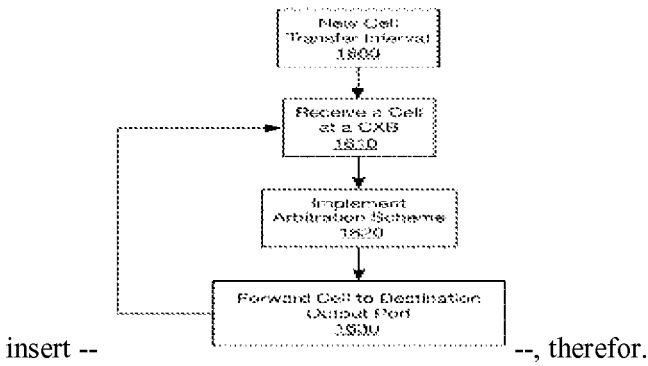 --, therefor.

In Fig. 18, Sheet 16 of 16, for Tag "1825", in Line 1, delete "Data" and insert -- Configuration Data --, therefor.

Specification

In Column 1, below Title, insert -- STATEMENT REGARDING FEDERALLY SPONSORED RESEARCH OR DEVELOPMENT
This invention was made with government support under grant CNS0435250 awarded by the National Science Foundation. The government has certain rights in the invention. --.

In Column 8, Line 29, delete "IP manager 124" and insert -- IP manager 114 --, therefor.

In Column 8, Line 42, delete "IP manager 124" and insert -- IP manager 114 --, therefor.

In Column 15, Line 44, delete "cell logic 1110" and insert -- cell logic 1210 --, therefor.

In Column 16, Line 22, delete "beings" and insert -- begins --, therefor.

In Column 16, Line 28, delete "Counts)," and insert -- Count), --, therefor.

In Column 17, Line 34, delete "block 1370" and insert -- block 1390 --, therefor.

In Column 18, Lines 45-46, delete "arbiter feature 1014)" and insert -- arbiter feature 1012) --, therefor.

In Column 19, Line 10, delete "beings" and insert -- begins --, therefor.

In Column 20, Lines 19-20, delete "arbiter feature 1114)" and insert -- arbiter feature 1112) --, therefor.

In Column 21, Lines 20-21, delete "forward feature 1214)" and insert -- forward feature 1216) --, therefor.

In Column 21, Line 25, delete "forward feature 1214)" and insert -- forward feature 1216) --, therefor.
In Column 23, Lines 31-32, delete "peripheral interfaces 1860" and insert -- peripheral interfaces 1870

--, therefor.

In Column 23, Line 41, delete "communication ports 982." and insert -- communication ports 1882. --, therefor.

Claims

In Column 30, Line 14, in Claim 27, delete "port to" and insert -- port --, therefor.